United States Patent [19]
Takahashi et al.

[11] Patent Number: 6,078,694
[45] Date of Patent: *Jun. 20, 2000

[54] IMAGE SIGNAL PADDING METHOD, IMAGE SIGNAL CODING APPARATUS, IMAGE SIGNAL DECODING APPARATUS

[75] Inventors: Jun Takahashi, Katanoshi; Choong Seng Boon, Moriguchishi, both of Japan

[73] Assignee: Matsushita Electric Industrial Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/956,372

[22] Filed: Oct. 23, 1997

[30] Foreign Application Priority Data

Oct. 24, 1996 [JP] Japan .................... 8-281975

[51] Int. Cl.⁷ .......................................... G06K 9/36
[52] U.S. Cl. ...................... 382/238; 382/232; 382/236
[58] Field of Search .................... 382/238, 232, 382/236; 341/51; 348/404, 407, 419; 358/261.2, 430

[56] References Cited

U.S. PATENT DOCUMENTS 5,608,458  3/1997  Chen et al. ..................... 348/413

FOREIGN PATENT DOCUMENTS 6-327003  11/1994  Japan ................. H04N 7/137
WO97/28650  8/1997  Japan .................. H04N 7/32

OTHER PUBLICATIONS

Video Group, International Organisation for Standardisation, MPEG4 Video Verification Model VM 8.0, Jul. 1997, pp. 1–283, and attachment pp. 1–20.

*Primary Examiner*—Jose L. Couso
*Assistant Examiner*—Anh Hong Do
*Attorney, Agent, or Firm*—Parkhurst & Wendel, L.L.P.

[57] ABSTRACT

A method of padding an image signal comprising dividing an image signal of an object into plural regions; processing the plural regions in a prescribed processing order; padding an insignificant region with a padding value obtained by a prescribed method; which region abuts a boundary region including a boundary of the object, and is composed of insignificant pixels; and generating additional information with reference to significant signals showing whether significant pixels are included, for each of the plural regions, by a prescribed method, which additional information is referred to when the pixel values of pixels in the plural regions are padded. Both the boundary region and the insignificant region adjacent to the boundary region are padded, and region by region padding is performed using the additional information. Therefore, when the image is encoded or decoded, a prediction signal with less difference can be obtained even for an image of great motion, whereby the delay time and the arithmetic amount in the coding and decoding processes are significantly reduced.

47 Claims, 23 Drawing Sheets

Fig.2 (a)

| D | C | B | A | A | B | C | D |
|---|---|---|---|---|---|---|---|
| H | G | F | E | E | F | G | H |
| L | K | J | I | I | J | K | L |
| P | O | N | M | M | N | O | P |

| A | B | C | D | D | C | B | A |
|---|---|---|---|---|---|---|---|
| E | F | G | H | H | G | F | E |
| I | J | K | L | L | K | J | I |
| M | N | O | P | P | O | N | M |

| A | B | C | D | A | B | C | D |
|---|---|---|---|---|---|---|---|
| E | F | G | H | E | F | G | H |
| I | J | K | L | I | J | K | L |
| M | N | O | P | M | N | O | P |

| A | B | C | D | A | B | C | D |
|---|---|---|---|---|---|---|---|
| E | F | G | H | E | F | G | H |
| I | J | K | L | I | J | K | L |
| M | N | O | P | M | N | O | P |

IMAGE SIGNAL PADDING METHOD, IMAGE SIGNAL CODING APPARATUS, IMAGE SIGNAL DECODING APPARATUS

FIELD OF THE INVENTION

The present invention relates to a method for padding an image signal having an arbitrary shape, an apparatus for coding an image signal using the padding method, an apparatus for decoding an image signal using the padding method, and a method of motion compensation. An image signal is a color signal showing pixel values or a transparency signal showing transparency of pixels.

BACKGROUND OF THE INVENTION

In order to store or transmit a digital image with efficiency, it is necessary to compressively encode the image signal. As a typical method for compressively encoding a digital image signal with efficiency, there is discrete cosine transformation (DCT) which is a main technique in typical standards, JPEG (Joint Photographic Experts Group) and MPEG (Moving Picture Experts Group). Besides the DCT, there are waveform coding methods such as sub-band coding, wavelet coding, and fractal coding. Further, in order to eliminate a redundant signal between images, inter-image prediction using motion compensation is performed to obtain a difference between images, i.e., a difference between an image currently being processed and a reference image, and this difference signal is subjected to waveform-coding, whereby coded data of a high compression ratio is obtained.

In recent years, a method of compressive coding has been proposed, in which plural objects constituting an image are individually encoded and transmitted so that reproduction of the image can be performed in object units. When the image so encoded is reproduced, the respective objects are decoded individually, and the decoded objects are synthesized to display the image.

When images are synthesized, required is information showing, pixel by pixel, whether the background is hidden by the overlaying image or not. This information used for synthesis is called "significant signal", and a pixel in which the background is hidden is called "significant pixel".

Further, edition of a moving picture is facilitated by coding an image signal in object units and combining the objects as desired using the coded signal. Furthermore, depending on busyness of transmission line, performance of reproduction apparatus, and tastes of viewer, it is possible to see a moving picture without reproducing relatively unimportant objects.

Furthermore, when an image (object) having an arbitrary shape is encoded, a coding method adaptive to the shape, for example, shape adaptive DCT, is employed. Alternatively, an insignificant region of the image (a region outside the object and comprising insignificant pixels only) is padded using a prescribed method and then encoded using conventional 8×8 cosine transformation or the like.

On the other hand, in a prediction region (e.g., a block comprising 16×16 pixels) which is obtained by motion-compensating a reference image reproduced in the past to eliminate a redundant signal between images, insignificant pixels may be included at the boundary of the object. For such a prediction region, it is padded first and then a difference between the prediction region and the target region is obtained to generate a prediction error signal, followed by transformation coding. The purpose of obtaining a difference with respect to the prediction region is to suppress a difference signal.

In the conventional method described above, a prediction region is obtained by a method like motion compensation after performing padding with reference to the whole image so that insignificant pixels are not included in the prediction region. In the padding process employed in the conventional method, using a pixel value of a significant pixel positioned at the object boundary repeatedly, pixel values of insignificant pixels are replaced with this significant pixel value. When two padding values are provided for a pixel due to padding in both the horizontal direction and the vertical direction, these padding values are averaged to obtain a padding value, and pixel values of insignificant pixels are replaced with this padding value. By padding the whole image in this way, a prediction region of less error can be obtained especially for an image that moves greatly.

However, in order to perform padding while referring to the whole of the reproduced reference image, the whole reference image must be decoded before starting the padding. Further, when the padding is repeated, the amount (complexity) of arithmetic operations (hereinafter, referred to simply as arithmetic amount) increases with an increase in the image size. That is, a delay occurs when the image is reproduced, sometimes leading to an enormous arithmetic amount.

As an arithmetic method in which the arithmetic amount is not proportional to the image size, there is a method of padding reproduced boundary regions region by region. This method can solve the problems relating to delay and arithmetic amount. In this method, however, since only the boundary region is padded, a significant region is restricted to a region within the padded boundary region. Hence, a prediction signal of less error cannot be generated for an image that moves greatly.

SUMMARY OF THE INVENTION

It is an object of the present invention to provide an image padding method that has reduced delay time and reduced arithmetic amount and that generates a prediction signal of less error for an image that moves greatly.

It is another object of the present invention to provide an image signal coding apparatus using the image padding method, which has reduced delay time and reduced arithmetic amount and generates a prediction signal of less error for an image that moves greatly.

It is still another object of the present invention to provide an image signal decoding apparatus using the image padding method, which has reduced delay time and reduced arithmetic amount and generates a prediction signal of less error for an image that moves greatly.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the invention, there is provided method of padding an image signal comprising the steps of dividing an image signal of an object having an arbitrary shape into plural regions; processing the plural regions in prescribed processing order; padding an insignificant region, which abuts on a boundary region including a boundary of the object and is composed of insignificant pixels only, with a padding value obtained by a prescribed method; and outputting the image signal. This method is characterized by the steps of generating additional information showing whether significant pixels are included or not, for each of the plural regions, by a prescribed method, with reference to significant signals showing whether pixel values of pixels included in the plural regions are significant or not; and performing padding of pixel values of pixels in the plural regions with reference to the additional information. Therefore, in image signal coding and decoding processes, a prediction signal with less difference can be obtained even for an image of great motion, whereby delay time and arithmetic amount in the coding and decoding processes are significantly reduced.

According to a second aspect of the invention, there is provided a method of padding an image signal comprising the steps of dividing an image signal of an object having an arbitrary shape into plural regions; processing the plural regions in prescribed processing order; padding an insignificant region, which abuts on a boundary region including a boundary of the object and is composed of insignificant pixels only, with a padding value obtained using pixel values of significant pixels in the boundary region and a prescribed function; and outputting the image signal. This method is characterized by the steps of generating additional information showing whether significant pixels are included or not, for each of the plural regions, by a prescribed method, with reference to significant signals showing whether pixel values of pixels included in the plural regions are significant or not; and performing padding of pixel values of pixels in the plural regions with reference to the additional information. Therefore, the same effects as mentioned above are obtained.

According to a third aspect of the invention, there is provided a method of padding an image signal comprising the steps of dividing an image signal of an object having an arbitrary shape into plural regions; processing the plural regions in prescribed processing order; padding pixel values of insignificant pixels in a boundary region including a boundary of the object with a padding value obtained by a prescribed method; padding an insignificant region, which abuts on the boundary region and is composed of insignificant pixels only, with a padding value obtained using the padded pixel values of pixels in the boundary region and a second function; and outputting the image signal. This method is characterized by the steps of generating additional information showing whether significant pixels are included or not, for each of the plural regions, by a prescribed method, with reference to significant signals showing whether pixel values of pixels included in the plural regions are significant or not; and performing padding of pixel values of pixels in the plural regions with reference to the additional information. Therefore, the same effects as mentioned above are obtained.

According to a fourth aspect of the invention, there is provided a method of padding an image signal comprising the steps of dividing an image signal of an object having an arbitrary shape into plural regions; processing the plural regions in prescribed processing order; padding an insignificant region, which abuts on a boundary region including a boundary of the object and is composed of insignificant pixels only, with a padding value obtained by a prescribed method; and outputting the image signal. The method is characterized by the steps of generating additional information showing whether significant pixels are included or not, for each of the plural regions, by a prescribed method, with reference to significant signals showing whether pixel values of pixels included in the plural regions are significant or not; in a case where a target region is not an insignificant region, when it is decided with reference to the additional information that a past region adjacent to the target region in the processing order is an insignificant region, padding the past region with a padding value obtained by a prescribed method; and in a case where the target region is an insignificant region, when it is decided with reference to the additional information that a past region adjacent to the target region in the processing order is not an insignificant region, padding the target region with a padding value obtained by a prescribed method. Therefore, the same effects as mentioned above are obtained.

According to a fifth aspect of the invention, there is provided a method of padding an image signal comprising the steps of dividing an image signal of an object having an arbitrary shape into plural regions; processing the plural regions in prescribed processing order; padding an insignificant region, which abuts on a boundary region including a boundary of the object and is composed of insignificant pixels only, with a padding value obtained by a prescribed method; and outputting the image signal. This method is characterized by the steps of generating additional information showing whether significant pixels are included or not, for each of the plural regions, by a prescribed method, with reference to significant signals showing whether pixel values of pixels included in the plural regions are significant or not; in a case where a target region is not an insignificant region, when it is decided with reference to the additional information that a past region adjacent to the target region in the processing order is an insignificant region, padding the past region with a padding value obtained by pixel values of significant pixels included in the target region and a prescribed function; and in a case where the target region is an insignificant region, when it is decided with reference to the additional information that a past region adjacent to the target region in the processing order is not an insignificant region, padding the target region with pixel values of significant pixels included in the past region and a prescribed function. Therefore, the same effects as mentioned above are obtained.

According to a sixth aspect of the invention, there is provided a method of padding an image signal comprising the steps of dividing an image signal of an object having an arbitrary shape into plural regions; processing the plural regions in prescribed processing order; padding an insignificant region, which abuts on a boundary region including a boundary of the object and is composed of insignificant pixels only, with a padding value obtained by a prescribed method; and outputting the image signal. This method is characterized by the steps of generating additional information showing whether significant pixels are included or not, for each of the plural regions, by a prescribed method, with reference to significant signals showing whether pixel values of pixels included in the plural regions are significant or not; in a case where a target region is not an insignificant region, padding pixel values of insignificant pixels included in the target region using a pixel value obtained by a prescribed method; when it is decided with reference to the additional information that a past region adjacent to the target region in the processing order is an insignificant region, padding the past region with a pixel value obtained using the padded pixel values of pixels included in the target region and a second function; and in a case where the target region is an insignificant region, when it is decided with reference to the additional information that a past region adjacent to the target region in the processing order is not an insignificant region, padding the target region with a padding value obtained using pixel valleys of pixels included in the past region and the second function. Therefore, the same effects as mentioned above are obtained.

According to a seventh aspect of the invention, there is provided a method of padding an image signal comprising the steps of dividing an image signal of an object having an arbitrary shape into plural regions; processing the plural regions in prescribed processing order; padding an insignificant region, which abuts on a boundary region including a boundary of the object and is composed of insignificant pixels only, with a padding value obtained by using pixel values of significant pixels within the boundary region and a prescribed function; and outputting the image signal, wherein the padding value is obtained using a copying function that uses pixel values of pixels included in the boundary region and corresponding to positions of pixels included in the insignificant region to be padded. Therefore, the same effects as mentioned above are obtained.

According to an eighth aspect of the invention, there is provided a method of padding an image signal comprising the steps of dividing an image signal of an object having an arbitrary shape into plural regions; processing the plural regions in prescribed processing order; padding an insignificant region, which abuts on a boundary region including a boundary of the object and is composed of insignificant pixels only, with a padding value obtained by using pixel values of significant pixels within the boundary region and a prescribed function; and outputting the image signal, wherein the padding value is obtained using a mirroring function that uses pixel values of pixels that are included in the boundary region and are positioned symmetrically with positions of pixels included in the insignificant region to be padded across a boundary where the boundary region abuts on the insignificant region. Therefore, the same effects as mentioned above are obtained.

According to a ninth aspect of the invention, there is provided a method of padding an image signal comprising the steps of dividing an image signal of an object having an arbitrary shape into plural regions; processing the plural regions in prescribed processing order; padding pixel values of insignificant pixels in a boundary region including a boundary of the object with a padding value obtained by a prescribed method; padding an insignificant region adjacent to the boundary region and comprising only insignificant pixels with a padding value obtained by using the padded pixel values of pixels in the boundary region and a second function; and outputting the image signal, wherein the padding value is obtained using a copying function that uses the padded pixel values of pixels included in the boundary region and corresponding to positions of pixels included in the insignificant region to be padded. Therefore, the same effects as mentioned above are obtained.

According to a tenth aspect of the invention, there is provided a method of padding an image signal comprising the steps of dividing an image signal of an object having an arbitrary shape into plural regions; processing the plural regions in prescribed processing order; padding pixel values of insignificant pixels in a boundary region including a boundary of the object with a padding value obtained by a prescribed method; padding an insignificant region adjacent to the boundary region and comprising only insignificant pixels with a padding value obtained by using the padded pixel values of pixels in the boundary region and a second function; and outputting the image signal, wherein the padding value is obtained using a mirroring function that uses the padded pixel values of pixels that are included in the boundary region and are positioned symmetrically with positions of pixels included in the insignificant region to be padded across a boundary where the padded boundary region abuts on the insignificant region. Therefore, the same effects as mentioned above are obtained.

According to an eleventh aspect of the invention, there is provided an image signal coding apparatus comprising an input means, a first addition means, a coding means, a decoding means, a second addition means, a padding means, a memory, and a prediction region generation means; wherein an image signal of an object having an arbitrary shape is input to the input means, the image signal is divided into plural regions adjacent each other, and the plural region are processed as target regions in prescribed processing order; the target region and a prediction region output from the prediction region generation means are input to the first addition means, wherein a difference region is generated; the difference region is input to the coding means, wherein the difference region is converted into a compressed difference region by a third method; the compressed difference region is input to the decoding means, wherein the compressed difference region is restored to a decompressed difference region by a fourth method; the decompressed difference region is input to the second addition means, wherein a reproduced region is generated by adding the prediction region to the decompressed difference region; the reproduced region is input to the padding means, wherein pixel values of insignificant pixels included in the reproduced region are padded by a fifth method, and the padded region is stored in the memory; the padded region stored in the memory is supplied to the prediction region generation means, wherein the prediction region is generated; and the compressed difference region signal is output from the apparatus. This apparatus is characterized by the padding means performing padding of pixel values by an image signal padding method according to any of the first, second, fourth, filth, seventh, and eighth aspects. Therefore, in the coding process, a prediction signal of less difference is obtained for an image of great motion, and delay time and arithmetic amount in the coding process are significantly reduced.

According to a twelfth aspect of the invention, there is provided an image signal coding apparatus comprising an input means, a first addition means, a coding means, a decoding means, a second addition means, a first padding means, a second padding means, a first memory, a second memory, and a prediction region generation means; wherein an image signal of an object having an arbitrary shape is input to the input means, the image signal is divided into plural regions adjacent each other, and the plural region are processed as target regions in prescribed processing order; the target region and a prediction region output from the prediction region generation means are input to the first addition means, wherein a difference region is generated; the difference region is input to the coding means, wherein the difference region is converted into a compressed difference region by a third method; the compressed difference region is input to the decoding means, wherein the compressed difference region is restored to a decompressed difference region by a fourth method, the decompressed difference region is input to the second addition means, wherein a reproduced region is generated by adding the prediction region to the decompressed difference region; the reproduced region is input to the first padding means, wherein pixel values of insignificant pixels in a boundary region including a boundary of the object included in the reproduced region are padded by a sixth method, and the padded region is stored in the memory; the content of the first memory is input to the second padding means, wherein an insignificant region which abuts on the boundary region included in the first memory content and is composed of insignificant pixels only, and the padded region is stored in the second memory as a second padded region; the second padded region stored in the second memory is supplied to the prediction region generation means, wherein the prediction region is generated; and the compressed difference region signal is output from the apparatus. This apparatus is characterized by the first and second padding means performing padding of pixel values by an image signal padding method according to any of the third, sixth, ninth, and tenth aspects. Therefore, the same effects as mentioned above are obtained.

According to a thirteenth aspect of the invention, there is provided an image signal decoding apparatus comprising an input means, a data analysis means, a decoding means, an addition means, a padding means, a memory, and a prediction signal generation moans; wherein a coded signal which has been compressively coded is input to the input means; the coded signal is analyzed in the data analysis means to produce a compressed difference signal; the compressed difference signal is decoded to a decompressed difference signal in the decoding means; a prediction signal is generated in the prediction signal generating means using an image signal obtained from the memory; the decompressed difference signal is added to the prediction signal in the addition means to produce a reproduced signal; and pixel values of insignificant pixels included in the reproduced signal are padded in the padding means by a prescribed method, and the padded signal is stored in the memory. This apparatus is characterized by the padding means performing padding of pixel values using a padding method according to any of the first, second, fourth, fifth, seventh, and eighth aspects. Therefore, in the decoding process, a prediction signal of less difference is obtained for an image of great motion, and delay time and arithmetic amount in the decoding process are significantly reduced.

According to a fourteenth aspect of the invention, there is provided an image signal decoding apparatus comprising an input means, a data analysis means, a decoding means, an addition means, a first padding means, a second padding means, a first memory, a second memory, and a prediction signal generation means; wherein a coded signal which has been compressively coded is input to the input means; the coded signal is analyzed in the data analysis means to produce a compressed difference signal; the compressed difference signal is decoded to a decompressed difference signal in the decoding means; a prediction signal is generated in the prediction signal generating means using an image signal obtained from the second memory; the decompressed difference signal is added to the prediction signal in the addition means to produce a reproduced signal; when the reproduced signal is a boundary region including the object boundary, pixel values of insignificant pixels in the boundary region are padded in the first padding means by a prescribed method, and the padded region is stored in the first memory; and an insignificant region which abuts on the boundary region stored in the first memory and is composed of insignificant pixels only is padded in the second padding means by a prescribed method, and the padded region is stored in the second memory. This apparatus is characterized by the first and second padding means performing padding of pixel values by a padding method according to any of the third, sixth, ninth, and tenth aspects. Therefore, the same effects as mentioned above are obtained.

According to a fifteenth aspect of the invention, there is provided an image signal decoding apparatus comprising an input means, a data analysis means, a decoding means, an addition means, a padding means, a memory, and a prediction signal generation means; wherein a coded signal which has been compressively coded is input to the input means; the coded signal is analyzed in the data analysis means to produce a compressed difference signal; the compressed difference signal is decoded to a decompressed difference signal in the decoding means; a prediction signal is generated in the prediction signal generating means using an image signal obtained from the memory; the decompressed difference signal is added to the prediction signal in the addition means to produce a reproduced signal; and pixel values of insignificant pixels included in the reproduced signal are padded by a prescribed method in the padding means, and the padded signal is stored in the memory. This apparatus is characterized by that the padding means performs padding of pixel values included an inside region of the whole image block excluding a peripheral region, using a padding method according to any of the first, second, fourth, fifth, seventh, and eighth aspects and, when a sub-prediction-region which is referred to for motion compensation includes a region outside the inside region, padding of an insignificant region in the peripheral region is performed simultaneously with the motion compensation. Therefore, the same effects as mentioned above are obtained.

According to a sixteenth aspect of the invention, there is provided an image signal decoding apparatus comprising an input means, a data analysis means, a decoding means, an addition means, a first padding means, a second padding means, a first memory, a second memory, and a prediction signal generation means; wherein a coded signal which has been compressively coded is input to the input means; the coded signal is analyzed in the data analysis means to produce a compressed difference signal; the compressed difference signal is decoded to a decompressed difference signal in the decoding means; a prediction signal is generated in the prediction signal generating means using an image signal obtained from the second memory; the decompressed difference signal is added to the prediction signal in the addition means to produce a reproduced signal; when the reproduced signal is a boundary region including the object boundary, pixel values of insignificant pixels in the boundary region are padded in the first padding means by a prescribed method, and the padded region is stored in the first memory; and an insignificant region which abuts on the boundary region stored in the first memory and is composed of insignificant pixels only is padded in the second padding means by a prescribed method, and the padded region is stored in the second memory. This apparatus is characterized by that the first and second padding means perform padding of pixel values included in an inside region of the whole image block excluding a peripheral region, using a padding method according to any of the third, sixth, ninth, and tenth aspects and, when a sub-prediction-region which is referred to for motion compensation includes a region outside the inside region, padding of an insignificant region in the peripheral region is performed simultaneously with the motion compensation.

According to a seventeenth aspect of the invention, there is provided a motion compensation method performing an image signal padding method according to any of the first to tenth aspects, in an image signal decoding apparatus, simultaneously with motion compensation. Therefore, in the decoding process, a prediction signal of less difference is obtained for an image of great motion, and delay time and arithmetic amount in the decoding process are significantly reduced.

According to an eighteenth aspect of the invention, there is provided a recording medium having a program of an image signal padding method according to any of the first to tenth aspects. Therefore, in image signal coding and decoding processes, a prediction signal with less difference can be obtained even for an image of great motion, whereby delay time and arithmetic amount in the coding and decoding processes are significantly reduced.

BRIEF DESCRIPTION OF THE DRAWINGS

FIGS. 2(a)–2(d) are schematic diagrams illustrating an example of a regional padding method used for the image signal padding method according to the first embodiment.

FIGS. 3(a)–3(d) are schematic diagrams illustrating another example of a regional padding method used for the image signal padding method according to the first embodiment.

DETAILED DESCRIPTION OF THE PREFERRED EMBODIMENTS

[Embodiment 1]

Figure 1:
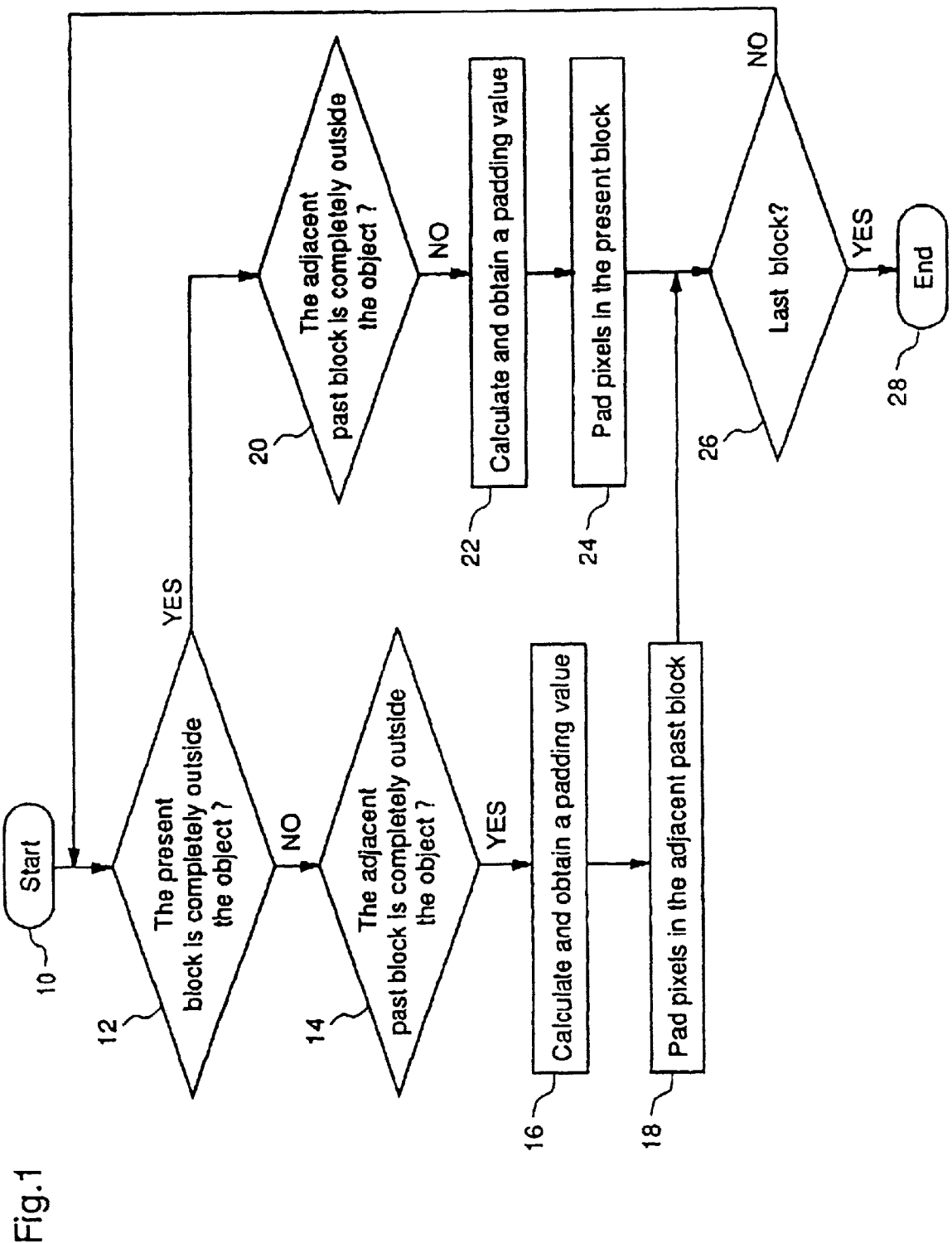
FIG. 1 is a flowchart for explaining an image signal padding method according to a first embodiment of the invention.
Figure 4:
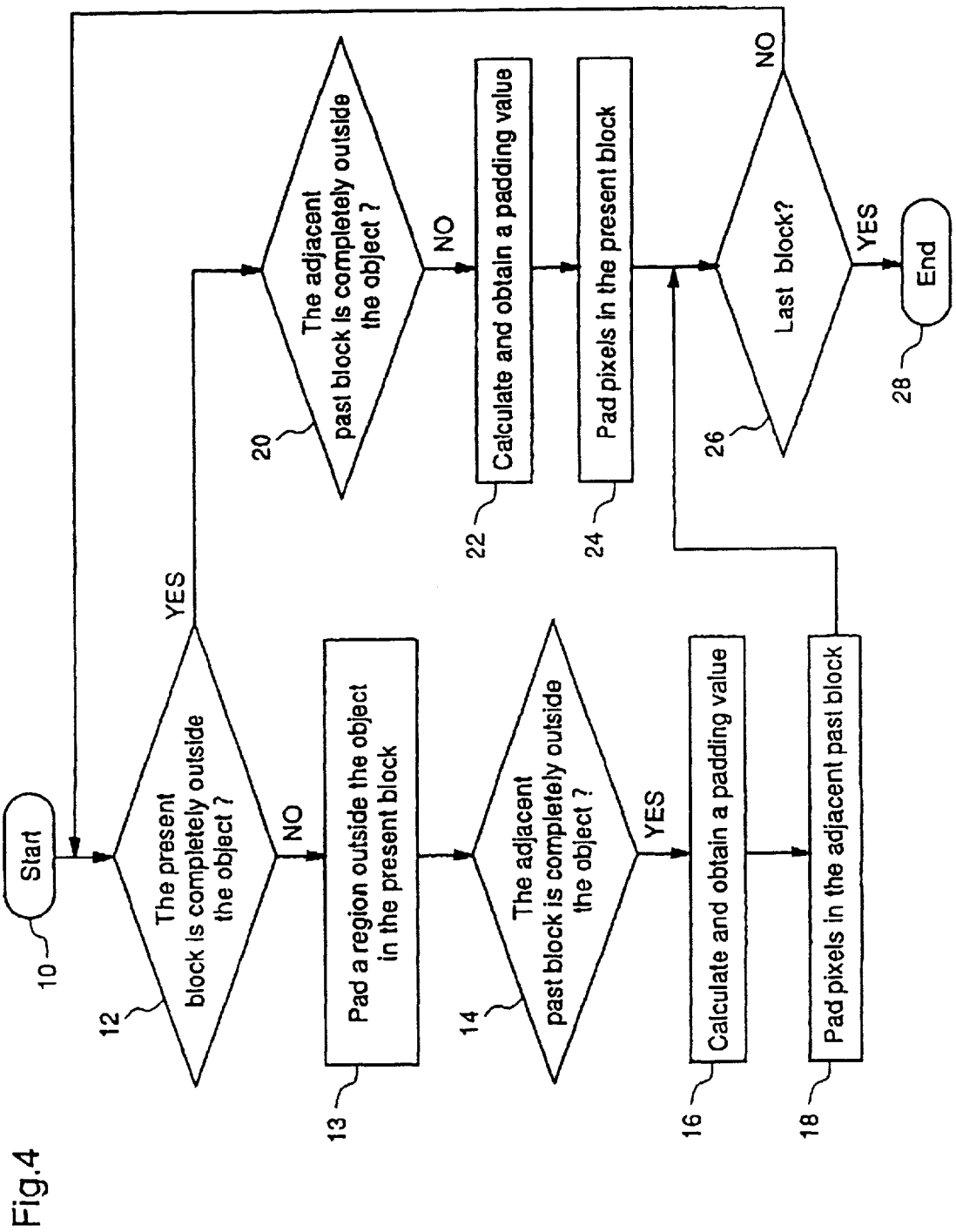
FIG. 4 is a flowchart for explaining a first modification of the image signal padding method according to the first embodiment.
Figure 5:
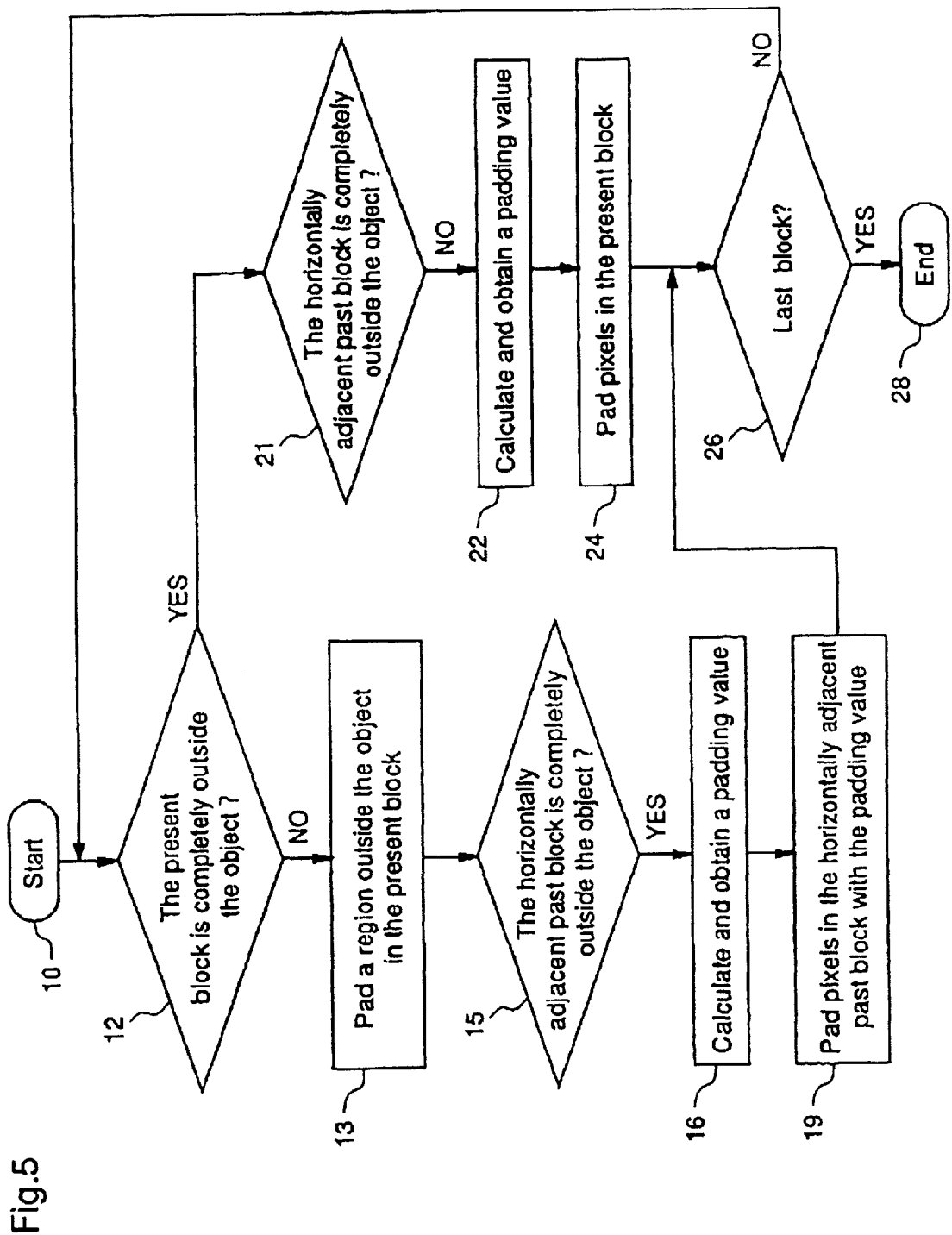
FIG. 5 is a flowchart for explaining a second modification of the image signal padding method according to the first embodiment.
Figure 6:
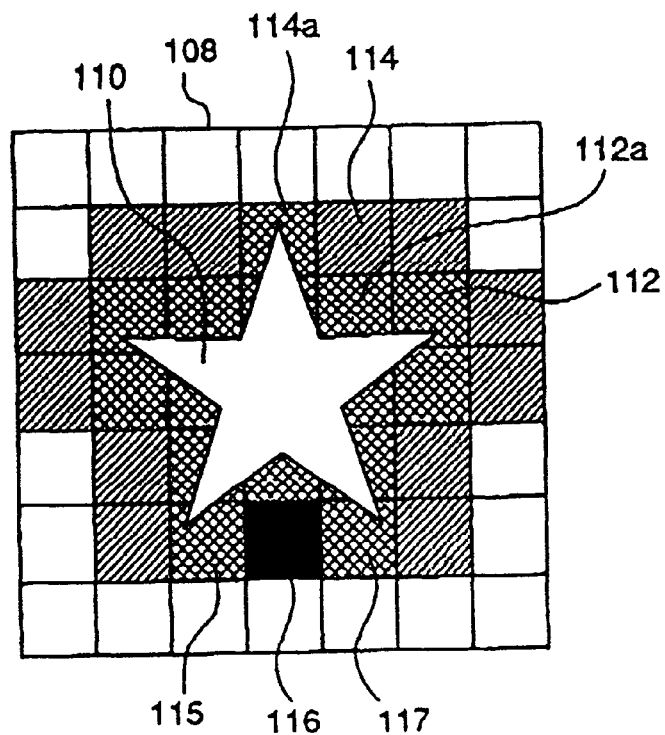
FIG. 6 is a schematic diagram showing a first example of an image padded by the padding method according to the first embodiment.
Figure 7:
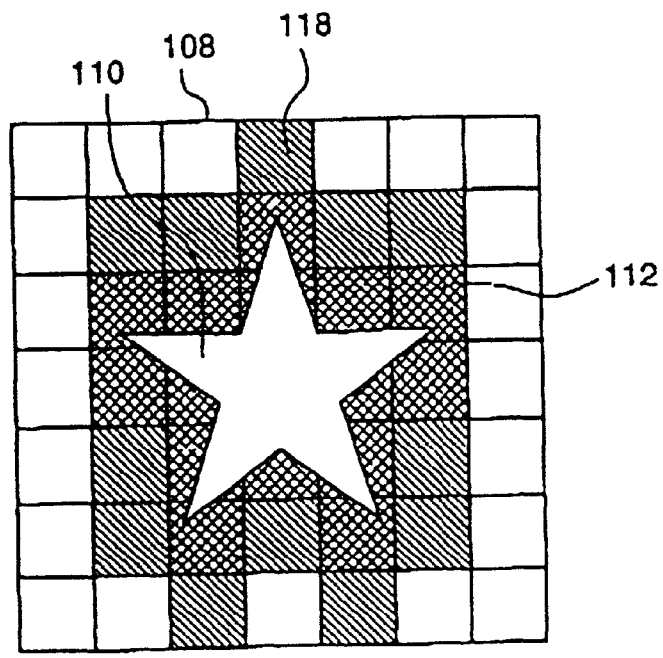
FIG. 7 is a schematic diagram showing a second example of an image padded by the padding method according to the first embodiment.
Figure 8:
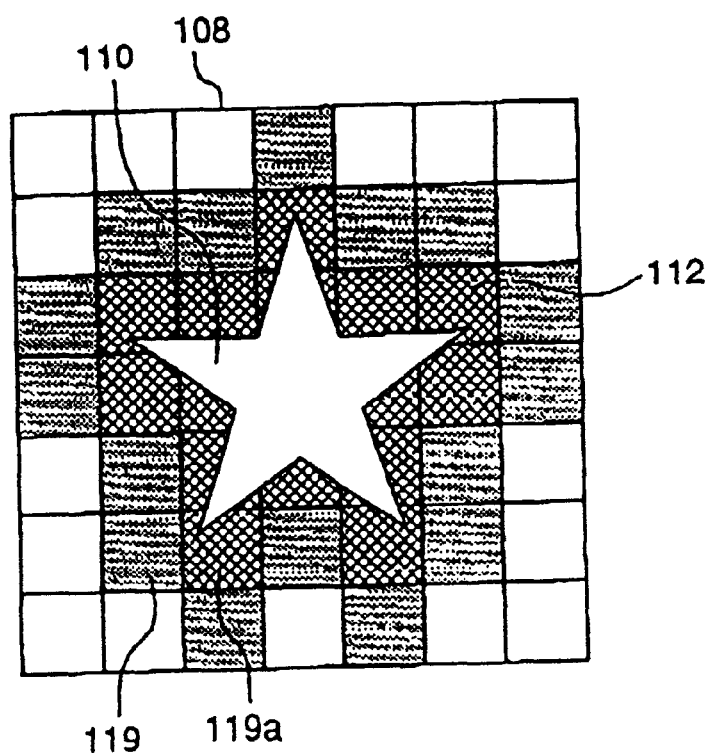
FIG. 8 is a schematic diagram showing a third example of an image padded by the padding method according to the first embodiment.
Figure 9:
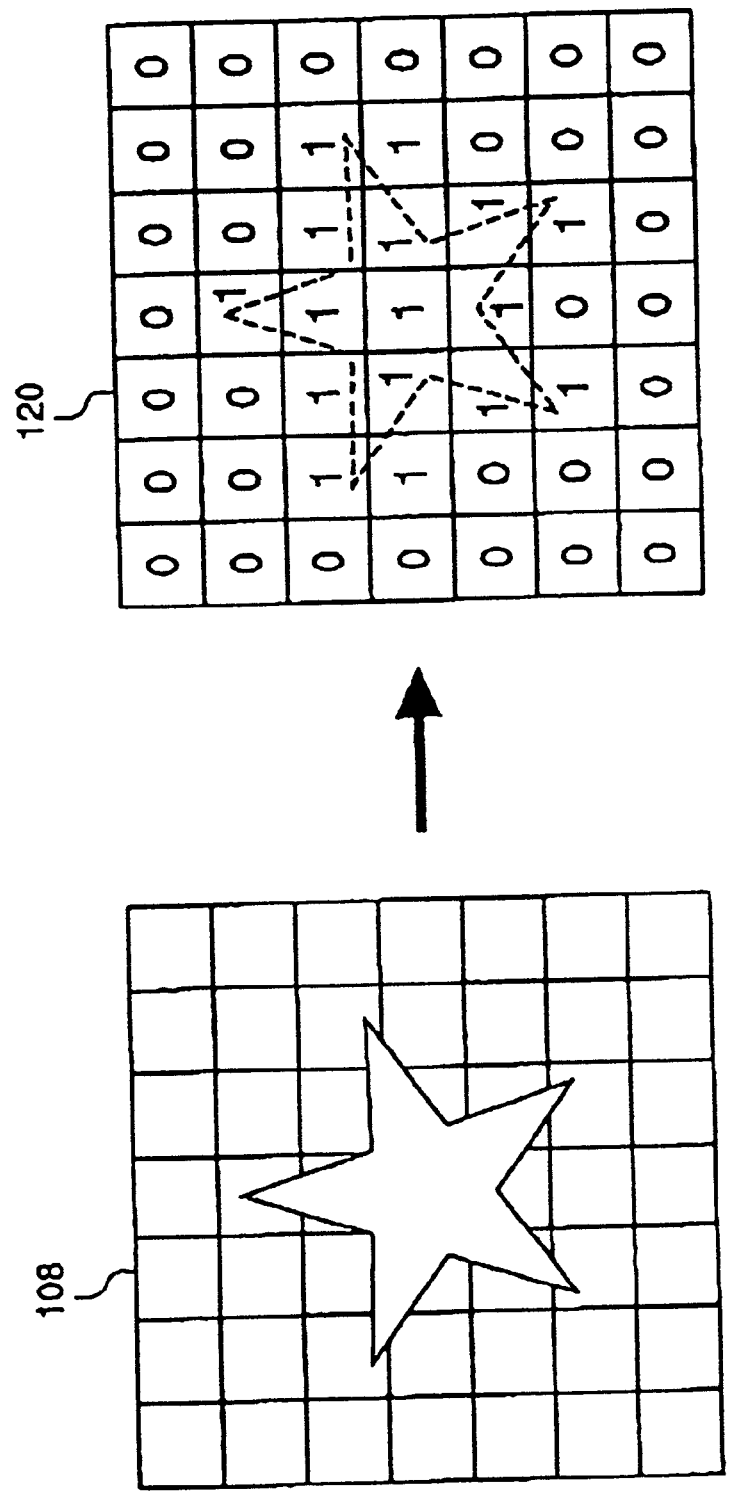
FIG. 9 is a schematic diagram for explaining generation of additional information which is referred to in the image signal padding method according to the first embodiment.

FIG. 1 is a flowchart for explaining a method of padding an image signal, using no additional information, according to a first embodiment of the invention. FIGS. 2(a)–2(d) and 3(a)–3(d) are diagrams for explaining the padding method in detail. FIGS. 4 and 5 are flowcharts in which the padding method shown in FIG. 1 is partially changed. FIGS. 6, 7, and 8 are diagrams showing how an image is padded by the method of FIG. 5. FIG. 9 is a diagram for explaining additional information used in this first embodiment. Hereinafter, the first embodiment of the invention will be described using these figures.

First of all, a description is given of a padding method according to the flowchart of FIG. 1. In this padding method, an input image signal having an arbitrary shape is divided into plural regions adjacent each other, and the image signal is padded region by region in prescribed order, i.e., each region is processed along the flowchart of FIG. 1. Scanning of these regions starts from the upper-left one and proceeds in the same order as raster scanning. The shape of each region may be any of triangle, rectangle, and square. In this first embodiment, the whole region is divided into plural square regions each comprising N×N pixels (N=8 or 16) Hereinafter, each square region comprising N×N pixels is called a block.

With reference to FIG. 1, in step 12, it is decided whether a block presently being a processing target (hereinafter, referred to as a present block) is completely outside an image having an arbitrary shape, i.e., an object. When the present block is completely outside the object ("YES" in step 12), all pixels in the block are insignificant. When the present block is not completely outside the object ("NO" in step 12), the present block includes significant pixels. Whether a pixel is significant or not is decided referring to, for example, a significant signal that is generated from a shape signal of the object. When the significant signal is "0", the pixel is insignificant. When the significant signal is "1", the pixel is significant.

When the present block is not completely outside the object ("NO" in step 12), the process proceeds to step 14. In step 14, it is decided whether a past block adjacent to the present block is completely outside the object. A past block is a block that has previously been processed in the scanning order. When the past block adjacent to the present block is completely outside the object ("YES" in step 14), a padding value for the past block is calculated and obtained by a prescribed method (step 16), and sample values of the past block are replaced with the padding value, i.e., padded. The padding value is calculated by an extending method in which a pixel value of a pixel inside the object in a boundary region, i.e., a block including the boundary of the object, is extended to the outside of the object in the boundary region, or to an insignificant region outside the boundary region.

When the present block is completely outside the object in step 12, the process proceeds to step 20. In step 20, it is decided whether the past block adjacent to the present block is completely outside the object. When the past block is not completely outside the object ("NO" in step 20), a padding value for the present block is calculated in step 22 by the same method as mentioned above, and sample values of the present block are replaced with the padding value, i.e., padded. After the adjacent past block is padded in step 18, it may be decided in step 20 that the adjacent past block is not completely outside the object. In other words, regions of reference pixels outside the object are padded by any method and the padded regions are included in the prediction region.

The above-mentioned process steps are repeated until the last block is processed (step 26).

FIGS. 2(a)–2(d) and 3(a)–3(d) are schematic diagrams for explaining a method of calculating a padding value. FIGS. 2(a)–2(d) show a case where the present block and the past block adjoin each other in the horizontal direction. In FIG. 2(a), a block 32 is the present block and a block 30 is the past block. Each block comprises pixels of pixel values A~P. Assuming that the block 30 is completely outside the object, pixel values A~P of pixels in the block 32 are assigned to pixel positions in the block 30 which are symmetrical with the block 32 across the boundary 31 of the blocks 30 and 32, whereby the block 30 is padded. That is, mirroring is employed as a padding function. The object boundary is shown by a line 33 between pixels A,E,I,M and pixels B,F,J,N in the block 32.

In FIG. 2(b), a block 35 is an object boundary region, i.e., a block including the object boundary, and a bock 37 is completely outside the object. In this case, as shown in the figure, pixel values A~P of pixels in the block 35 are assigned to pixel positions which are symmetrical with the block 35 across the boundary 36 of the blocks 35 and 37, i.e., mirroring is performed, whereby the block 37 is padded.

In FIG. 2(c), a block 42 is the present block, and a block 40 is the past block. Assuming that the block 40 is completely outside the object, as shown in the figure, pixel values A~P of pixels in the block 42 are assigned to corresponding pixel positions in the block 40, i.e., the block 40 is padded by copying.

In FIG. 2(d), a block 47 is the present block, and a block 45 is the past block. Assuming that the block 47 is completely outside the object, as shown in the figure, pixel values A~P of pixels in the block 45 are assigned to corresponding pixel positions in the block 47, i.e., the block 47 is padded by copying.

FIGS. 3(a)–3(d) show a case where the present block and the past block adjoin each other in the vertical direction.

Figures 3A, 3B, 3C, 3D:
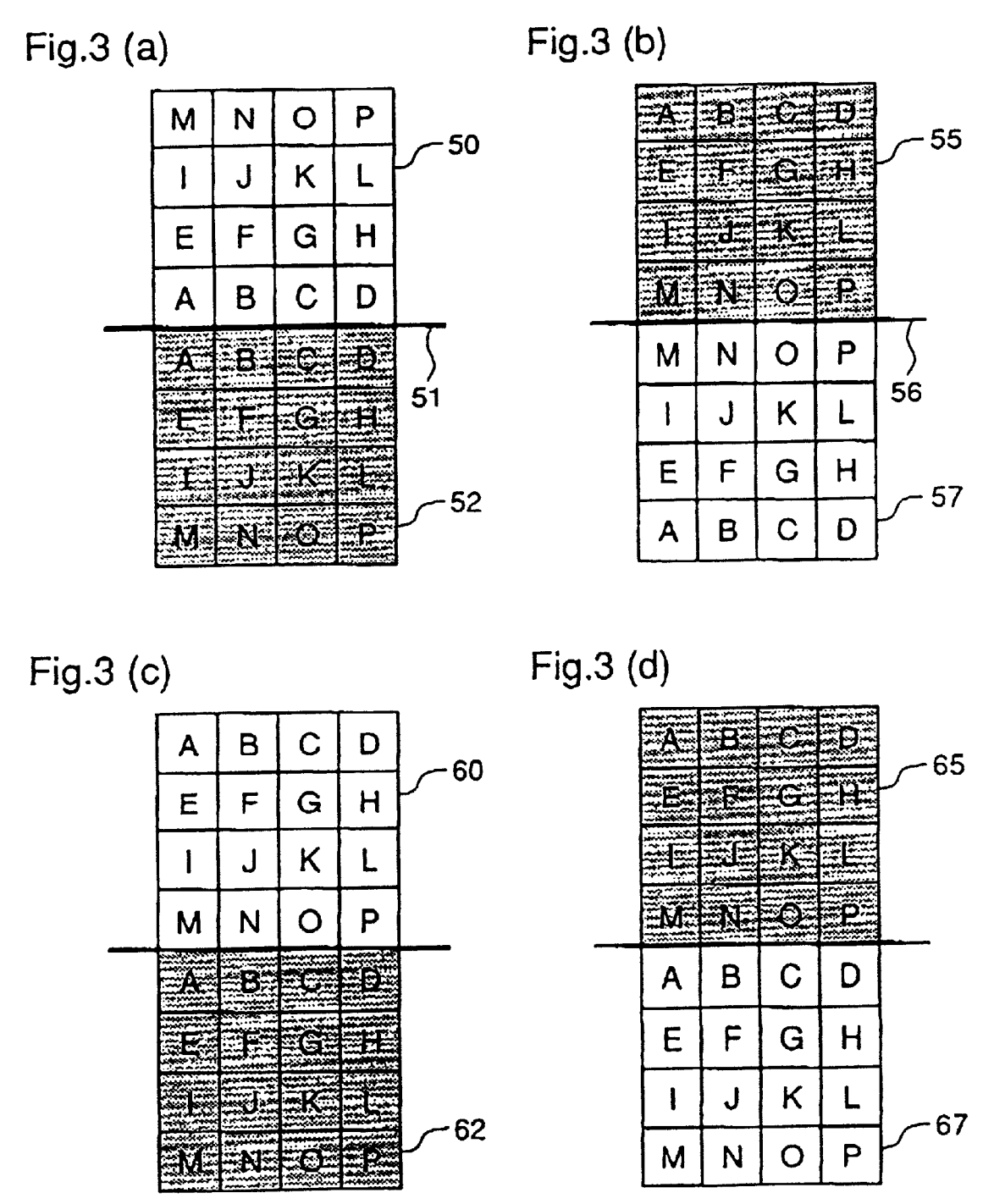

In FIG. 3(a), a block 50 is the present block, and a block 52 is the past block. Assuming that the block 50 is completely outside the object, pixel values A~P of pixels in the block 52 are assigned to pixel positions which are symmetrical with the block 52 across the block boundary 51, i.e., the block 50 is padded by mirroring.

In FIG. 3(b), a block 57 is the present block, and a block 55 is the past block. Assuming that the block 57 is completely outside the object, pixel values A~P of pixels in the block 55 arc assigned to pixel positions which are symmetrical with the block 55 across the block boundary 56, i.e., the block 57 is padded by mirroring.

In FIG. 3(c), a block 62 is the present block, and a block 60 is the past block. Assuming that the block 60 is completely outside the object, pixel values A~P of pixels in the block 62 are assigned to corresponding pixel positions in the block 62, i.e., the block 60 is padded by copying.

In FIG. 3(d), a block 67 is the present block, and a block 65 is the past block. Assuming that the block 67 is completely outside the object, pixel values A~P of pixels in the block 65 are assigned to corresponding pixel positions in the block 67, i.e., the block 67 is padded by copying.

In FIGS. 2(a)–2(d) and 3(a)–3(d), for the blocks 32, 35, 42, 45, 52, 55, 62, and 65 positioned on the object boundary, i.e., including the object boundary, the above-mentioned padding process may be performed after calculating an average of pixel values of significant pixels in the block and assigning the average to insignificant pixels in the block.

Further, although a 4×4 block is (employed to facilitate the description, a padding method for an N×N block (N=arbitrary integer) is identical to the above-mentioned method.

FIG. 4 is a flowchart for explaining another method of padding an image signal according to the first embodiment, and this method is identical to the method shown in FIG. 1 except that step 13 is added. In step 13, when the present block 32 shown in FIG. 2(a) is not completely inside the object, a portion of the present block 32, which is outside the object, is padded. More specifically, as shown in FIG. 2(a), when pixels A, E, I, and M in the present block 32 are outside the object boundary 33, i.e., outside the object, the following padding methods are employed.

One method is to generate an average of twelve pixel values in the block 32 other than the pixels A, E, I, and M and assign this average to the pixels A, E, I, and M to pad these pixels.

Another method is to pad the pixels A, E, I, and M with pixels B, F, J, and N, which are inside the block 32 and abut on the object boundary 33, by repeating these pixels B, F, J, and N across the object boundary 33 in the horizontal direction. Although only the horizontal padding is employed in the above case, it is possible to pad in both the horizontal direction and the vertical direction. In this case, two padding values will be provided for one pixel, so that an average of the two padding values is obtained as a padding value.

FIG. 5 is a flowchart for explaining another method of padding an image signal according to the first embodiment, in which steps 14, 18, and 20 shown in FIG. 4 are respectively replaced with steps 15, 19, and 21 which are restricted to process steps using the past block adjacent to the present block in the horizontal direction.

FIG. 6 shows an image 108 padded according to the process steps shown in FIG. 5. A region inside a star-shaped object 110 is a significant object region, and a region outside the significant object region is an insignificant region comprising insignificant pixels only. The image 108 is divided into 7×7 blocks. Cross-hatched blocks, such as a block 112, are blocks padded in step 13 in FIG. 5. Parallel-hatched blocks, such as a block 114, are blocks padded in step 19 or 24 in FIG. 5.

The procedure for padding the image 108 will be described using FIGS. 5 and 6. Initially, the block 112 is concerned. Since it is decided in step 12 that the present block 112 is not completely outside the object, a portion of the block 112 outside the object is padded with the cross-hatched pattern in step 13. Since it is decided in step 15 that the past block 112a adjacent to the present block 112 in the horizontal direction is not completely outside the object, step 16 not executed.

Next, the block 114 is concerned. However, this block 114 is processed prior to the block 112. Since it is decided in step 12 that the present block 114 is completely outside the object, step 12 is followed by step 21. Since it is decided in step 21 that the past block 114a adjacent to the present block 114 in the horizontal direction is not completely outside the object, a padding value is calculated with reference to pixel values of pixels in the block 114a outside the object (step 22). Using the padding value, the present block 114 is padded with the parallel-hatched pattern (step 24).

The other blocks are padded in the same manner as mentioned above and, finally, a block 116 is processed. Since it is decided in step 12 that the present block 116 is completely outside the object, step 12 is followed by step 21. Since the past block 115 adjacent to the present block 116 in the horizontal direction is not completely outside the object, a padding value is calculated with reference to the past block 115 (step 22), and padding is performed using the padding value, i.e., the present block 116 is padded with reference to the past block 115 (step 24).

When a block 117 is processed, since it is decided in step 12 that the present block 117 is not completely outside the object, the block 117 is padded in step 13. Since it is decided in step 15 that the past block 116 adjacent to the block 117 in the horizontal direction is completely outside the object ("YES" in step 15), a padding value is calculated with reference to the pixel values in the past block 116 in step 16, and the block 117 is padded in step 19. That is, the block 117 is padded twice. When plural padding values are provided for one block, padding of the block may be performed using one of the padding values. When the padding values are averaged, an average may be calculated using specific padding values only.

As described above, the object of the image 108 can be padded by extending in the horizontal direction.

Further, steps 15, 19, and 21 in FIG. 5 for horizontal extension may be changed to steps for vertical extension. In this case, an image which is vertically extended and padded is obtained as shown in FIG. 7. When the vertical extension and the horizontal extension are combined, an image which is horizontally and vertically extended and padded is obtained as shown in FIG. 8. In this case, since padding is performed two or more Limes, two or more padding values arc provided. Then, all or some of the padding values are averaged. Further, when there are plural padding candidates, a specific padding candidate may be used, or overwrite may be performed using the latest padding candidate in the processing order.

FIG. 9 is a schematic diagram for explaining a manner of generating additional information when padding is performed by any of the padding methods described with respect to FIGS. 1, 4, and 5. As shown in FIG. 9, for a block completely outside the object, "0" is generated as additional information and given to the block. For the other blocks, i.e., a block having a portion inside the object (like the block 112 shown in FIGS. 6~8) and a block completely inside the object, "1" is generated as additional information and given to these blocks.

Although two values "0" and "1" respectively showing "completely outside the object" and "not completely outside the object", are used as additional information, three values showing "completely outside the object", "on the object boundary", and "completely inside the object" may be used as additional information.

Figure 10:
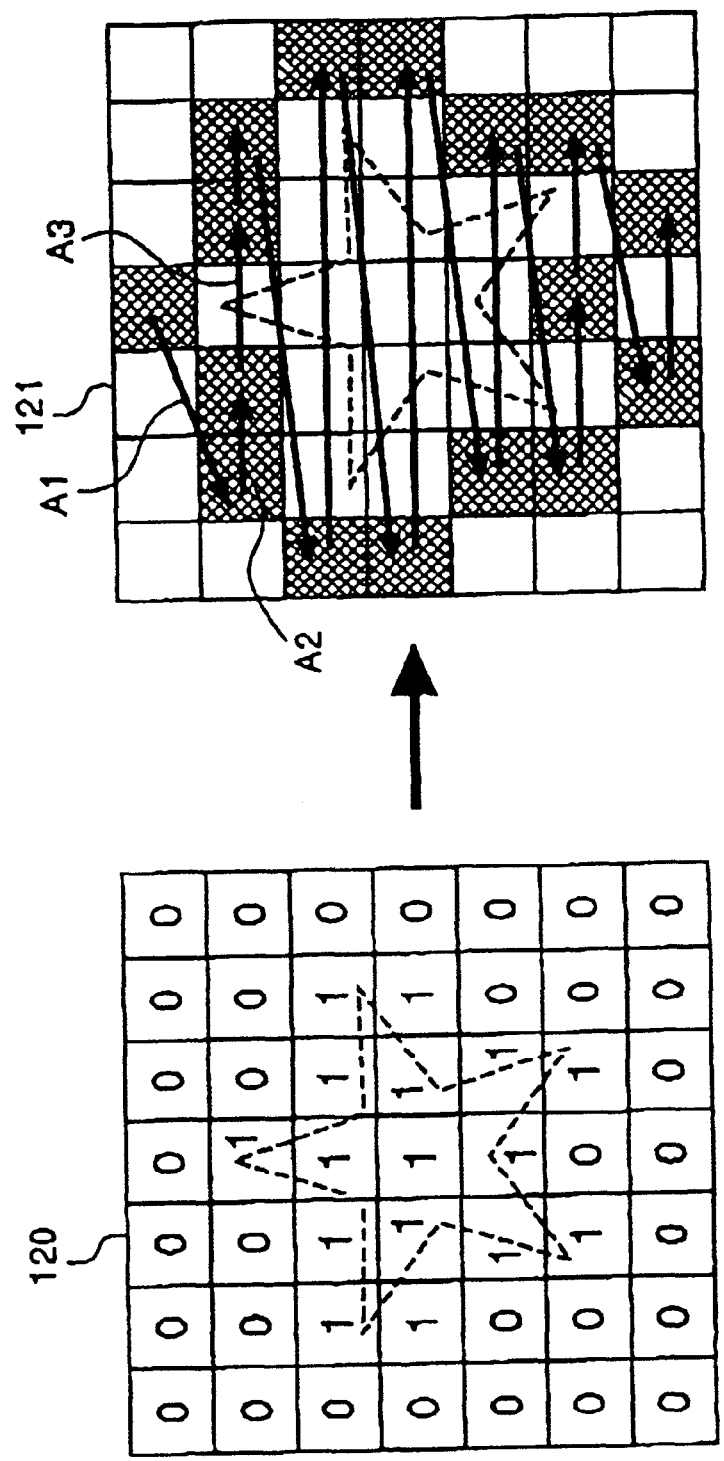
FIG. 10 is a schematic diagram for explaining generation of additional information which is referred to in the image signal padding method according to the first embodiment, and a padding process using the additional information.
Figure 11:
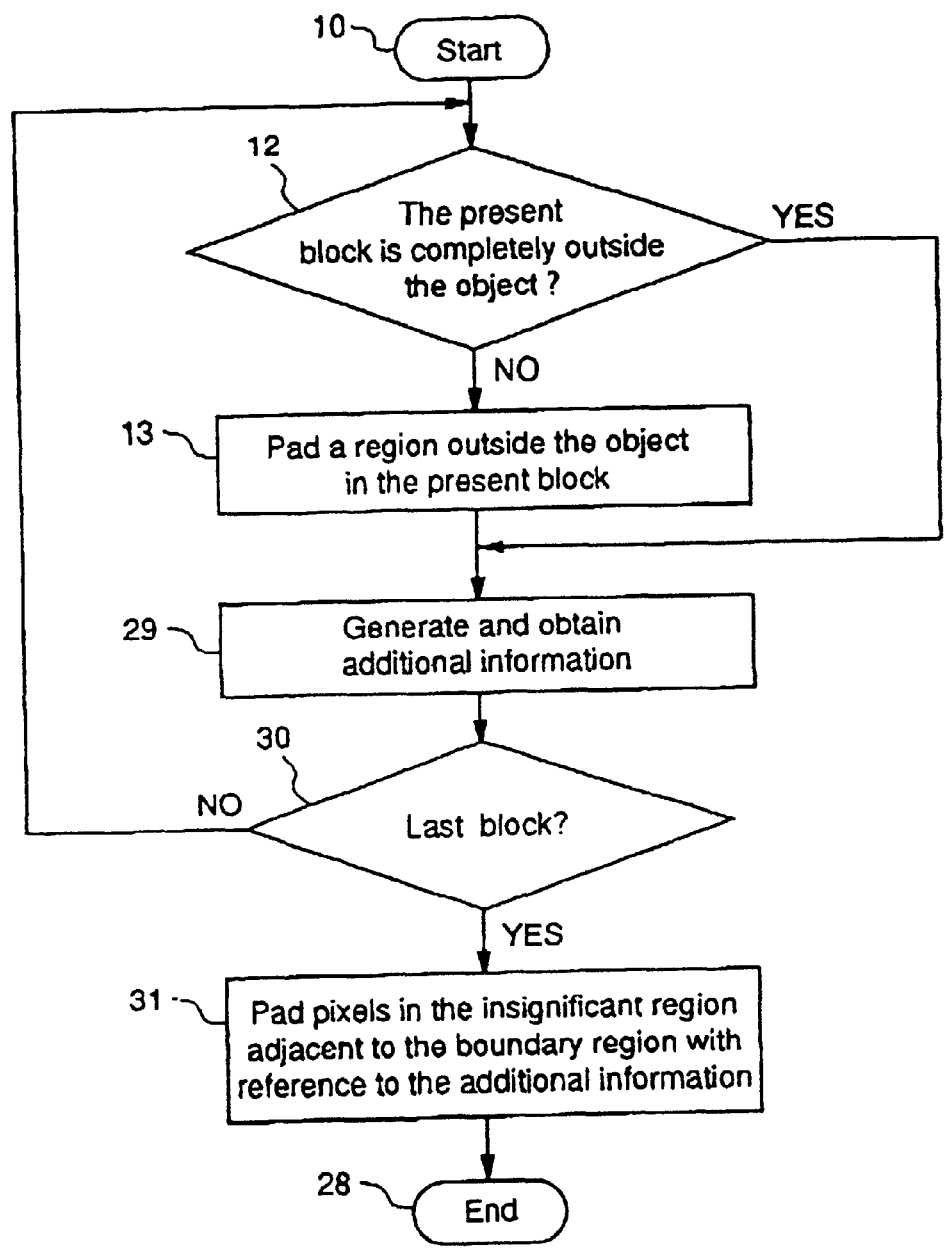
FIG. 11 is a flowchart for explaining generation of additional information which is referred to in the image signal padding method according to the first embodiment.

FIG. 10 is a diagram showing a manner of padding an image signal using the additional information shown in FIG. 9. FIG. 11 is a flowchart of a padding method in which additional information is generated and padding is performed using the additional information.

A description is given of a padding method using additional information, according to the first embodiment of the invention.

When it is decided in step 12 that the present block is completely outside the object, additional information "0" is generated and obtained (step 29), followed by step 30. When the present block is not completely outside the object ("NO" in step 12), a padding value is generated by a prescribed method (e.g. to provide an average of significant pixel values in the block), and insignificant pixels in the block are padded with this padding value in step 13, followed by step 29 wherein additional information "1" is generated and obtained (refer to the additional information block 120 shown in FIG. 10). when the last block in the processing order has been processed, referring to the additional information in the additional information block 120, as shown in an image b lock 121 in FIG. 10, blocks completely outside the object and having additional information "1" are successively padded in the order of arrows A1, A2, A3, . . . , each arrow connecting two of these blocks. At this time, by referring to the additional information in the additional information block 120, pixel values referred to for generating a padding value for the padding process can be pixel values in a specific region. That is, with reference to pixel values of pixels in blocks whose additional information in the additional information block is "1" reference pixel values can be pixel values in an insignificant region corresponding to blocks outside the object.

Figure 12:
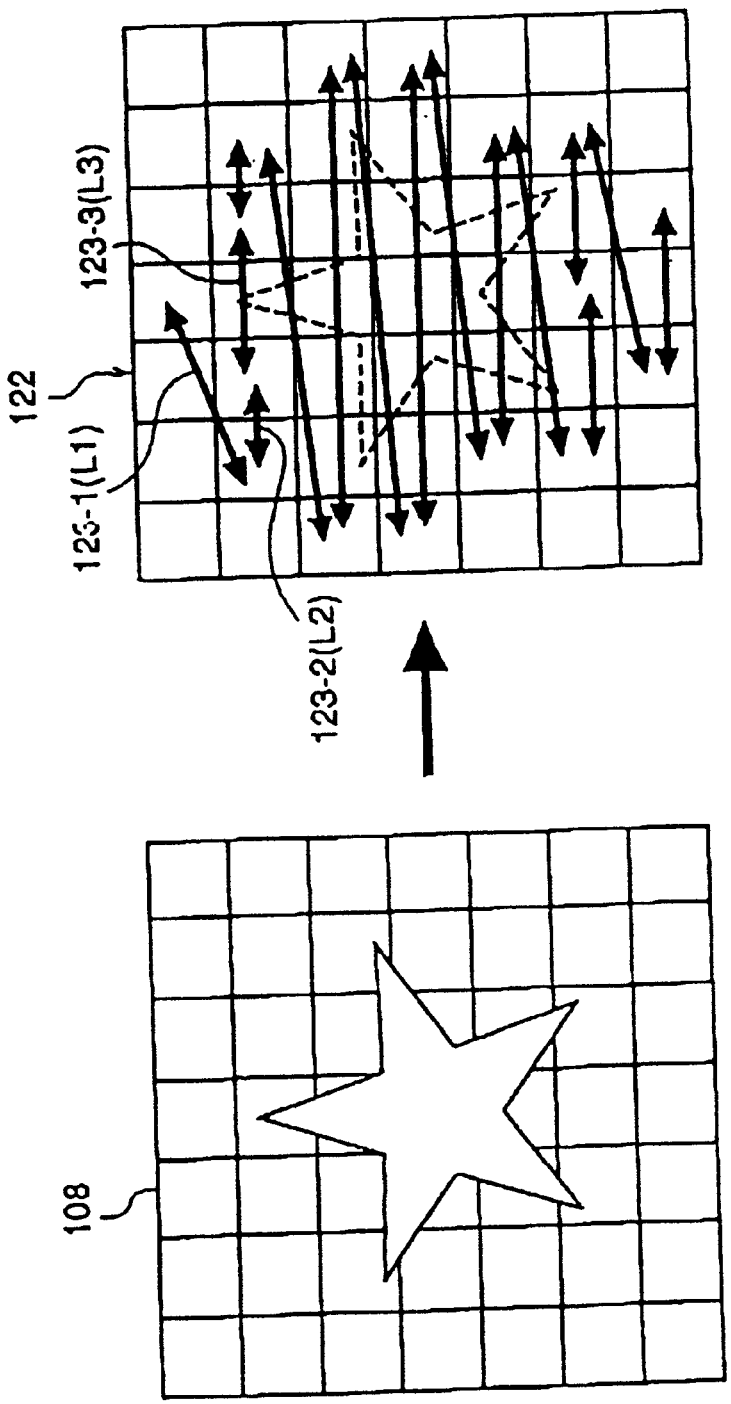
FIG. 12 is a schematic diagram for explaining generation of additional information which is referred to in the image signal padding method according to the first embodiment.

FIG. 12 is a diagram showing a case where additional information is distances between insignificant regions to be padded, in the image signal padding method according to the first embodiment. More specifically, in an image 122 shown in FIG. 12, the padding process can be performed efficiently with reference to distances (L1, L2, L3, . . . ) between blocks which are completely outside the object and are padding targets, as shown by arrows 123-1, 123-2, 123-3, . . . which show lengths of arrows A1, A2, A3, . . . in FIG. 10, respectively. Since significant signals exist corresponding to the respective pixels, in order to decide whether each block is "outside the object", "inside the object", or "on the boundary" using the significant signals only, all the pixels in the block must be checked. In this first embodiment, however, since additional information is generated in advance and padding is performed with reference to the additional information, it is not necessary to refer to all the significant signals in the block.

Figure 13:
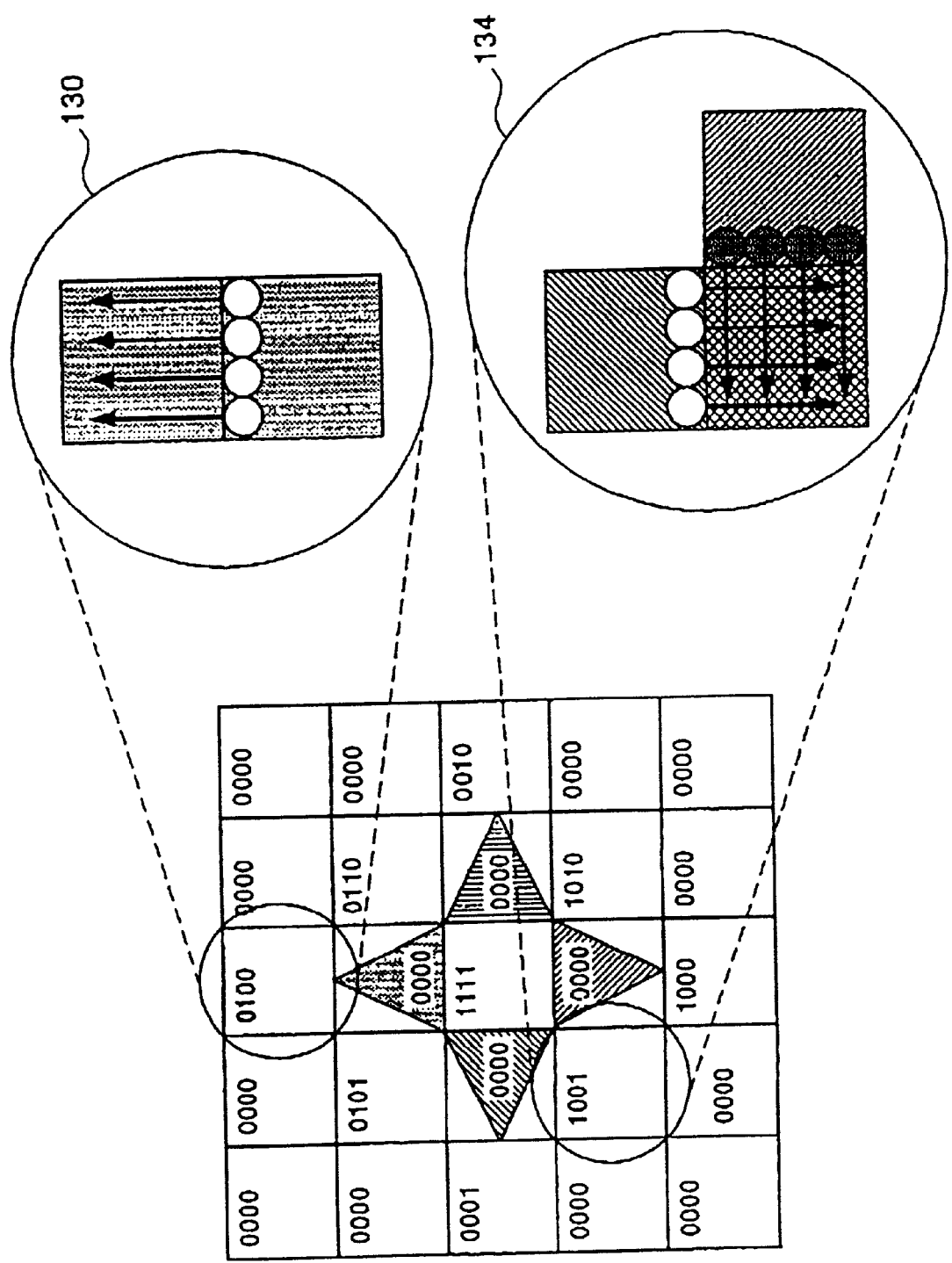
FIG. 13 is a schematic diagram for explaining generation of additional information which is referred to in the image signal padding method according to the first embodiment, and a padding process using the additional information.

FIG. 13 is a schematic diagram for explaining a case where additional information that shows whether a block adjacent to a target block (present block) is an insignificant region or not is generated for each of plural blocks Lo be processed. In FIG. 13, four values of "0" or "1" in each block (e.g., "0000") respectively mean whether the upper, lower, left, and right blocks are an insignificant region (0) or not (1). In case of a block 130, since this block is an insignificant region and its additional information is "0100", padding is performed referring to a padding value obtained from the lower block. In FIG. 13, insignificant pixels in the lower block have already been padded by the padding method described with respect to FIGS. 5 and 6, and the target block is padded using the padding value also. In case of a block 134, since this block has additional information of "1001", padding values are obtained from the upper block and the right block. Also in this case, insignificant pixels in the upper and right blocks have already been padded using the padding method described with respect to FIGS. 5 and 6, and the target block is padded using the padding values also. In this case, since two or more padding values are provided for the block 134, an average of pixel values of plural specific portions, for example, pixel values of pixels adjacent to the block 134 at its upper and right boundaries, is obtained with reference to the additional information, as shown by the horizontal and vertical arrows in FIG. 13. Alternatively, a padding value obtained from a specific portion is employed.

Figure 14:
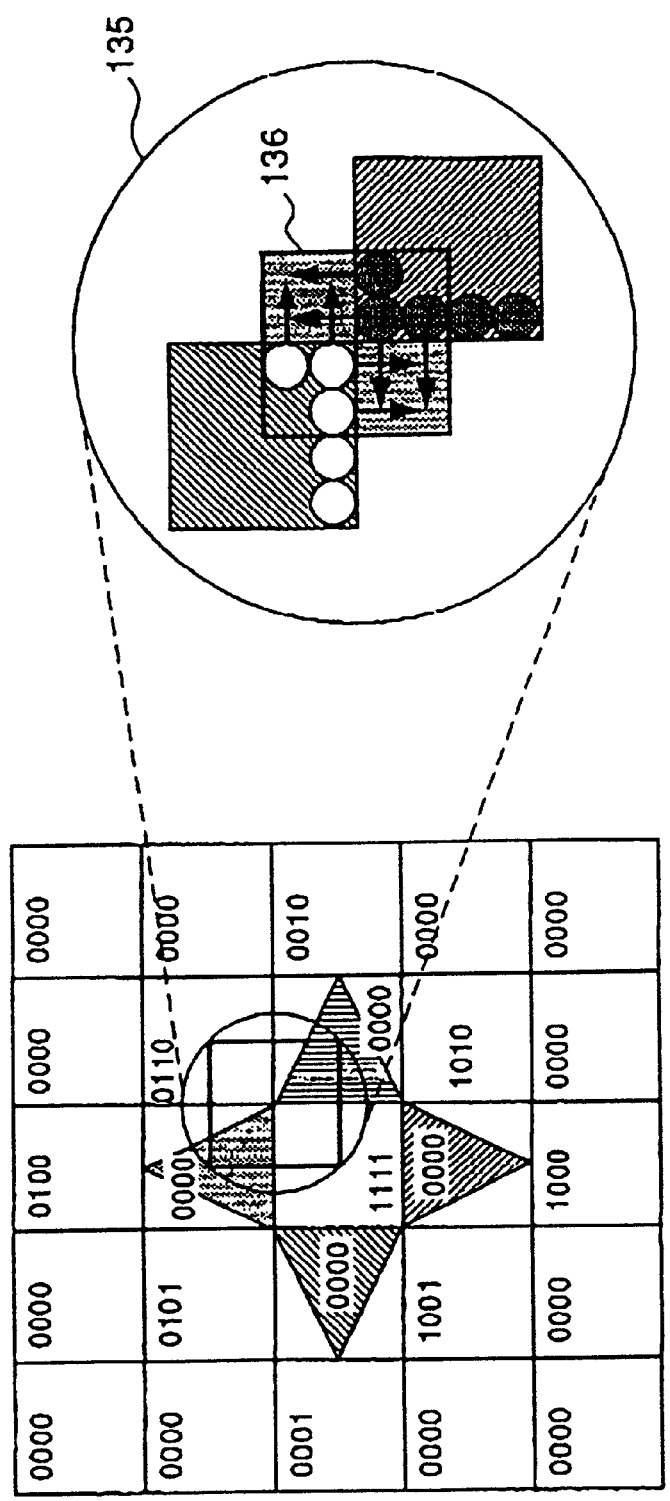
FIG. 14 is a schematic diagram for explaining generation of additional information which is referred to in the image signal padding method according to the first embodiment, and a padding process using the additional information.

FIG. 14 is a schematic diagram for explaining a case where a padding value is generated from specific reference values with reference to additional information and padding is performed using the padding value. In an image portion 135, when pixels in a square portion 136 are padded, i.e., when upper-left, lower-left, lower-right, and upper-right portions in the square portion 136 are padded, padding is performed by extending significant pixel values or already padded pixel values as shown by arrows in the figure, with reference to additional information added to blocks in which the respective portions belong and, if necessary, significant signals of pixels in the respective portions. Since the upper-left and lower-right portions of the square portion 136 are boundary portions, these portions may be previously padded by a prescribed method like the above-mentioned extending method. In this case, it is not necessary to refer to the significant signals of pixels in the respective portions.

Although additional information of four digits is used for reference, the same processing as mentioned above can be performed using additional information of one digit, i.e., "0" or "1".

As described above, when the boundary region has been padded in advance with reference to the additional information, only the remaining insignificant region becomes a target of padding. In this case, only the insignificant region can be processed with reference to the additional information, i.e., with no necessity of deciding whether it is an insignificant region or not using significant signals, whereby the processing efficiency is improved.

In the padding method mentioned above, only the boundary regions including the object boundary are padded in advance. When the padded image is referred to, if the referred region includes insignificant regions, i.e., when insignificant regions are left after the padding process of the boundary regions, these insignificant regions are padded.

While in this first embodiment additional information is generated with reference to significant signals, additional information can be generated with reference to any information with which whether a block is insignificant or not can be decided, such as image signal, significant signal, and side information generated when an image signal is compressively coded. For example, an address possessed by each block, or header information added for coding blocks can be employed.

Furthermore, the padding process according to this first embodiment can be performed without generating additional information specially. That is, the padding process may be performed with reference to, as additional information, any information with which whether a block is insignificant or not can be decided, such as significant signal, image signal, and side information as mentioned above.

Furthermore, another example of additional information is described in the following. In a case where it is decided that the target region is not an insignificant region with reference to significant signals showing whether pixel values in pixels in plural regions ace significant or not, when a past region adjacent to the target region in prescribed processing order is an insignificant region, the position of the past region may be generated as additional information for padding.

[Embodiment 2]

Figure 15:
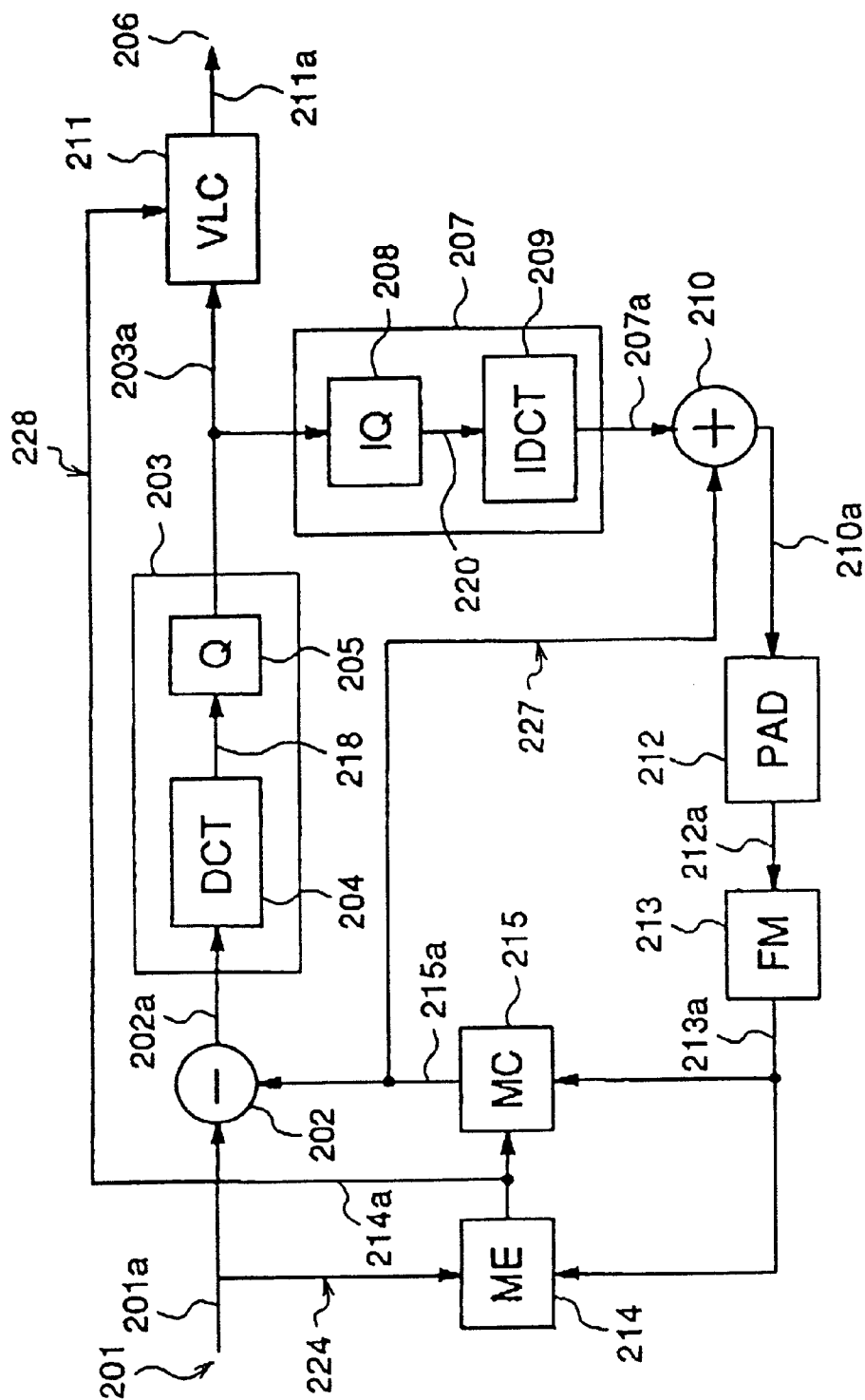
FIG. 15 is a block diagram illustrating an image signal coding apparatus according to a second embodiment of the invention.

FIG. 15 is a block diagram illustrating an image signal coding apparatus according to a second embodiment of the present invention. In FIG. 15, reference numeral 201 designates an input terminal to which an image signal to be coded is applied. A first adder 202 performs subtraction between the input signal 201a applied to the input terminal 201 and a motion compensation signal 251a supplied from a motion compensator 215 described later, and outputs a difference signal 202a. An encoder 203 encodes the output 202a from the first adder 202. The encoder 203 comprises a discrete cosine transformer (DCT) 204 and a quantizer 205. A variable length encoder (VLC) 211 performs variable length coding to an output from the encoder 203 with reference to a motion detecting signal 214a described later. An output 211a of the variable length encoder 211 is output from an output terminal 206. A decoder 207 decodes the output from the encoder 203. This decoder 207 comprises an inverse quantizer 208 and an inverse discrete cosine transformer (IDCT) 209. A second adder 210 adds an output 207a from the decoder 207 and the output 215a from the motion compensator 215. A padding unit 212 pads an output 210a from the second adder 210. A frame memory 213 stores an output 212a from the padding unit 212. A motion detector 214 detects a motion of the image from the present image signal (the input signal 201) and a reference image (an output 213a from the frame memory 213). A motion compensator 215 outputs a motion compensating signal 215a on the basis of a motion detecting signal 214a output from the motion detector 214 and the reference image 213a output from the frame memory 213.

The image signal coding apparatus so constructed operates as follows.

An image signal having an object of an arbitrary shape is input to the input terminal 201. The input image signal 201a is divided into plural regions adjacent each other. In this second embodiment, the input image signal is divided into plural blocks each having 8×8 or 16×16 pixels, but it may be divided into arbitrarily-shaped blocks. With reference to FIG. 15, a block being a target of coding (hereinafter referred to as a target block) in the input image signal 201a is transmitted through a line 224 and input to the motion detector 214. At the same time, a previously reproduced image 213a (hereinafter, referred to as a reference image) stored in the frame memory 213 is input to the motion detector 214. The motion detector 214 detects motion displacement information that gives a prediction signal of the smallest error to the target block (hereinafter, referred to as a motion vector) by block matching or the like, and outputs a motion vector 214a. The motion vector 214a is sent to the motion compensator 215, wherein a prediction block 215a is generated from the reference image 213a according to the motion vector 214a. This prediction block 215a is transmitted through a line 228 to the variable length encoder 211, converted to a variable length code 211a, and output to the output terminal 206. On the other hand, the target block 201a and the prediction block 215a are sent to the first adder 202, wherein a residual block 202a is generated. This residual block 202a is compressed in the encoder 203 comprising the discrete cosine transformer 204 and the quantizer 205. The quantized data 203a is sent to the variable length encoder 211, converted to a variable length code 211a, and output to the output terminal 206 together with side information including motion vectors. On the other hand, the compressed and quantized data 203a is sent to the decoder 207, wherein the data 203a is expanded. In this second embodiment, the data 203a is inversely quantized in the inverse quantizer 208 and then expanded to data in a spatial region in the inverse discrete cosine transformer 209. The prediction block 215a transmitted through a line 227 is added to the expanded residual block 207a, thereby generating a reproduced block 210a. The reproduced block 210a is input to the padding unit 212, wherein pixel values of insignificant pixels in the reproduced block are padded by the above-mentioned extending method in which a pixel value inside the object in a block corresponding to a boundary region including the object boundary is extended to the position of an insignificant pixel outside the object in the boundary region, or to an insignificant region adjacent to the boundary region or an insignificant region adjacent to the insignificant region next to the boundary region. Alternatively, the pixel values of insignificant pixels in the reproduced block are padded with a padding value which is obtained by using the pixel values of significant pixels at the boundary of the boundary region or the pixel values of pixels in the boundary region padded by the extending method, and the copying function or the mirroring function described above. The reproduced block 212a so padded is stored in the frame memory 213. Although it is not shown in FIG. 15, to decide whether pixels are significant or not, significant signals previously encoded and decoded are employed.

The padded image stored in the frame memory 213 is as shown in any of FIGS. 6, 7, and 8. The padded image 213a is sent to the motion detector 214 and to the motion compensator 215. In this second embodiment, the ranges of motion detection and motion compensation are limited to the padded region (in FIGS. 6, 7, and 8, the cross-hatched, parallel-hatched, and dotted regions). That is, pixels outside the padded regions are not referred to.

Further, although it is not shown in the figure, the padding process may be performed as follows. The additional information used for the padding method according to the first embodiment is generated with reference to significant signals. In the padding unit 212, a portion having the same pattern as the cross-hatched pattern of the block 112 shown in FIG. 8 is padded and, in the motion compensator 215, a portion corresponding to the block 119 is padded with reference to the additional information, i.e., the fact that a block 119a on the right of the block 119 has additional information "1".

Figure 16:
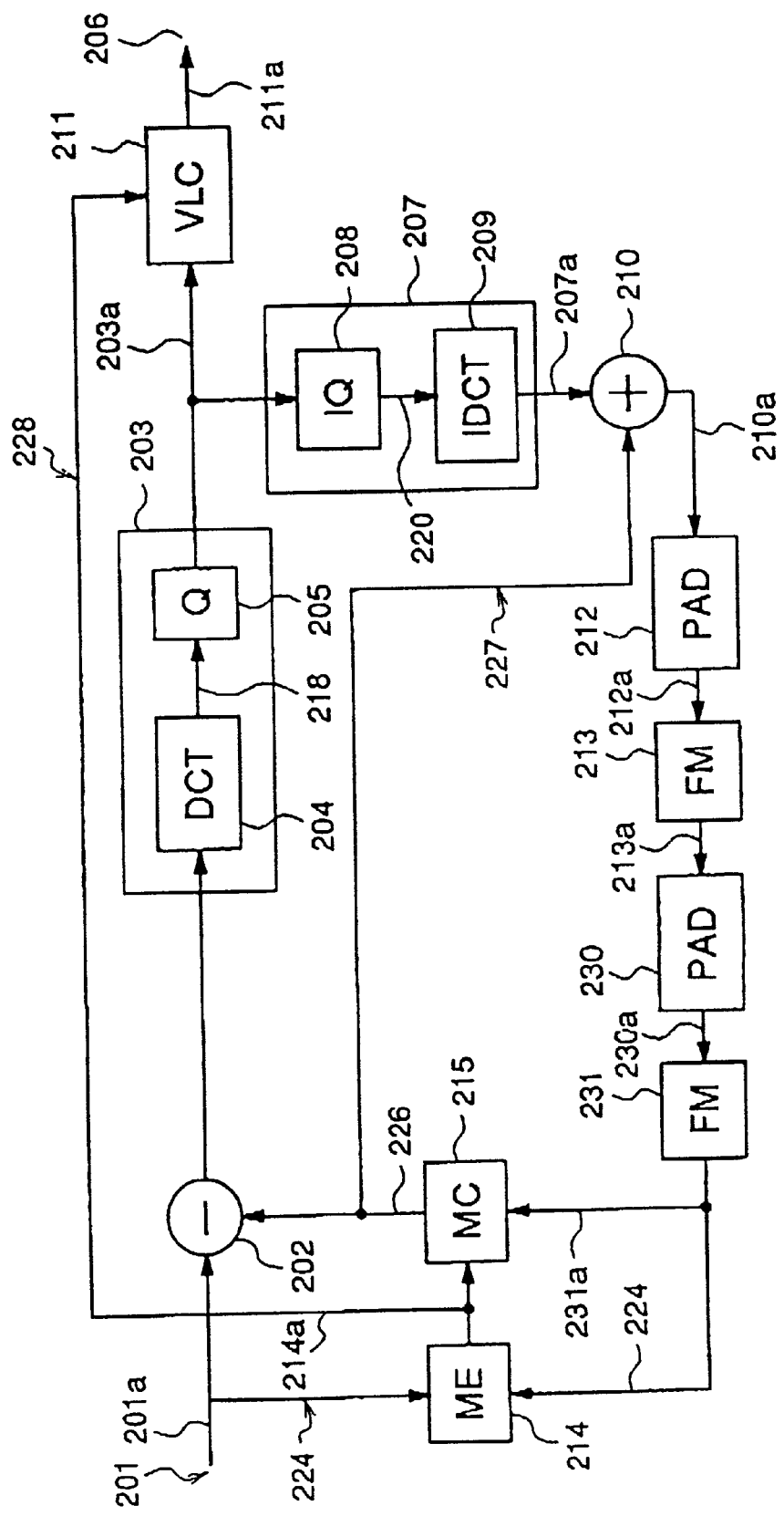
FIG. 16 is a block diagram illustrating an image signal coding apparatus according to a modification of the second embodiment of the invention.

FIG. 16 is a block diagram illustrating an image signal coding apparatus according to a modification of the second embodiment of the invention. This apparatus is identical to the apparatus shown in FIG. 15 except that a second padding unit 230 and a second frame memory 213 are added. The second padding unit 230 performs second padding for the output 213a from the frame memory 213, and the second frame memory 231 stores a result 230a of the second padding and outputs the result as a reference image 231a. In this modification, the additional information used for the padding method according to the first embodiment is generated with reference to significant signals. In the padding unit 212, a portion having the same pattern as the cross-hatched pattern of block 112 shown in FIG. 8 is padded, and this is stored in the frame memory 213. In the second padding unit 230, a portion corresponding to the block 119 shown in FIG. 8 is padded with reference to the additional information, i.e., the fact that a block 119a on the right of the block 119 has additional information "1", and this is stored in the second frame memory 231.

As described above, the ranges of motion detection and motion compensation are increased by padding regions adjacent to the object boundary region, whereby a prediction block with less residual, i.e., with a small value of the residual block 202a, is provided even for an image of great motion. Further, in the padding method according to the invention, padding is performed block by block with reference to additional information, delay time in padding and arithmetic amount can be reduced.

Although discrete cosine transformation is employed in this second embodiment, the image coding apparatus according to this second embodiment may be applied to cases employing shape adaptive discrete cosine transformation, sub-band coding, and wavelet transformation are employed.

[Embodiment 3]

Figure 17:
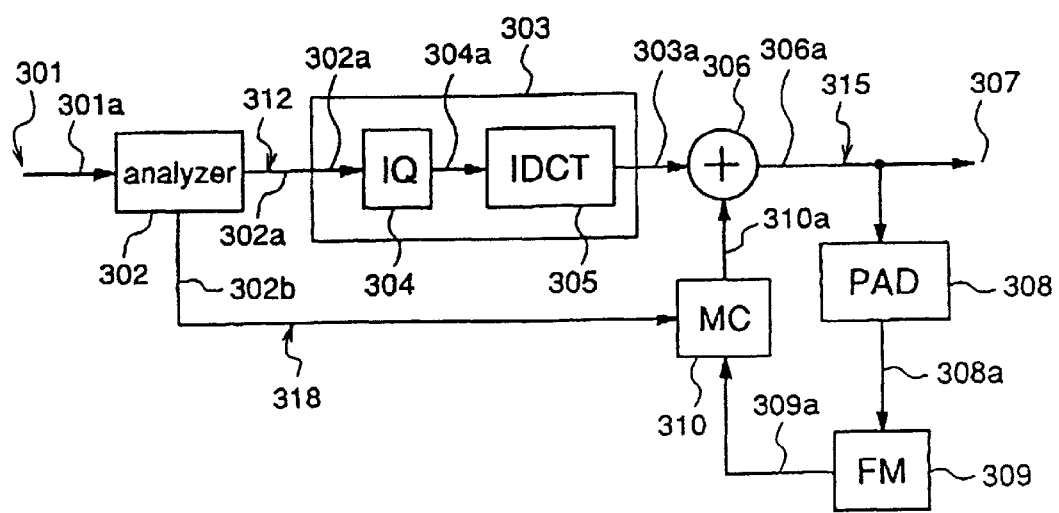
FIG. 17 is a block diagram illustrating an image signal decoding apparatus according to a third embodiment of the invention.

FIG. 17 is a block diagram illustrating an image signal decoding apparatus according to a third embodiment of the present invention. In FIG. 17, an image signal 301a to be decoded is input to an input terminal 301. A data analyzer 302 analyzes the input image signal 301a. A decoder 303 decodes an output 302a from the analyzer 302. The decoder 303 comprises an inverse quantizer 304 and an inverse discrete cosine transformer 305. An adder 306 adds an output 303a from the decoder 303 and an output 310a from a motion compensator 310 described later. An output 306a from the adder 306 is output from an output terminal 307. A padding unit 308 performs padding to the output 306a from the adder 306. A frame memory 309 stores an output 308a from the padding unit 308. A motion compensator 310 performs motion compensation to an output 309a from the frame memory 309.

The image signal decoding apparatus so constructed operates as follows.

Compressed and encoded data 301a input to the input terminal 301 is analyzed in the data analyzer 302. Then, data in a compressed residual block 302a, which data has been analyzed, is transmitted through a line 312 and input to the decoder 303, and a motion vector 302b is transmitted through a line 318 and input to the motion compensator 310. In the decoder 303, the compressed residual block 302a is expanded to restore the compressed block to an expanded residual block 303a. In this third embodiment, the block 302a is subjected to inverse quantization in the inverse quantizer 304, and a frequency region signal is transformed to a spatial region signal in the inverse discrete cosine transformer 305. In the motion compensator 310, an address for accessing to the frame memory 309 is generated on the basis of the motion vector 302a. A prediction block 309a is generated from an image stored in the frame memory 309.

The generated prediction block 309a and the expanded residual block 303a are added in the adder 306, generating a reproduced block 306a. The reproduced block 306a is sent to the output terminal 307 and, simultaneously, it is input to the padding unit 308, wherein the reproduced image 306a is padded using any of the padding methods according to the first embodiment. The padded image 308a is stored in the frame memory 309.

Although it is not shown in the figure, the padding process may be performed as follows. In the padding unit 308, a boundary region corresponding to a block including the object boundary, such as the block 112 shown in FIG. 8, is padded by a prescribed method, such as the extending method in which a pixel value inside the object in a block corresponding to the boundary region is extended to the outside of the object, and additional information showing whether each block includes a significant pixel or not is generated. The block referred to by the motion compensator 310 is padded by a prescribed method using the additional information and, using the padded reference block, a prediction block is generated.

Figure 18:
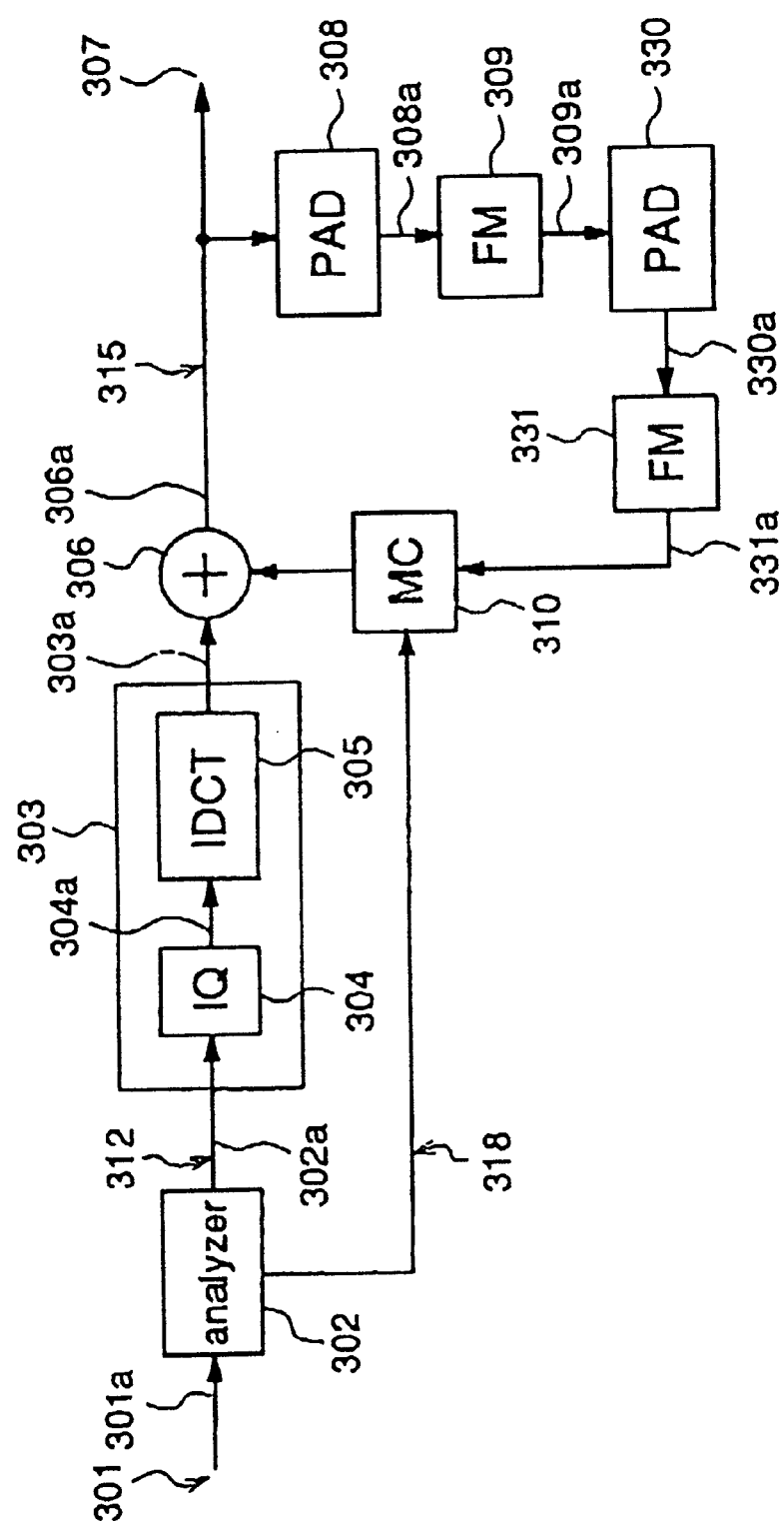
FIG. 18 is a block diagram illustrating an image signal decoding apparatus according to a first modification of the third embodiment of the invention.

FIG. 18 is a block diagram illustrating an image signal decoding apparatus according to a modification of this third embodiment. The apparatus shown in FIG. 18 is identical to the apparatus shown in FIG. 17 except that a second padding unit 330 and a second frame memory 331 are added. The second padding unit 330 performs second padding to the output 309a from the frame memory 309, and the second frame memory 331 stores an output 330a from the second padding unit 330 and outputs it as a reference image 331a. In the first padding unit 308, a boundary region including the object boundary, like the checker-patterned block 112 shown in FIG. 8, by a prescribed method, and additional information showing whether each block includes a significant pixel or not is generated. In the second padding unit 330, a portion corresponding to the block 119 shown in FIG. 8 is padded with reference to the additional information by a prescribed method.

Figure 19:
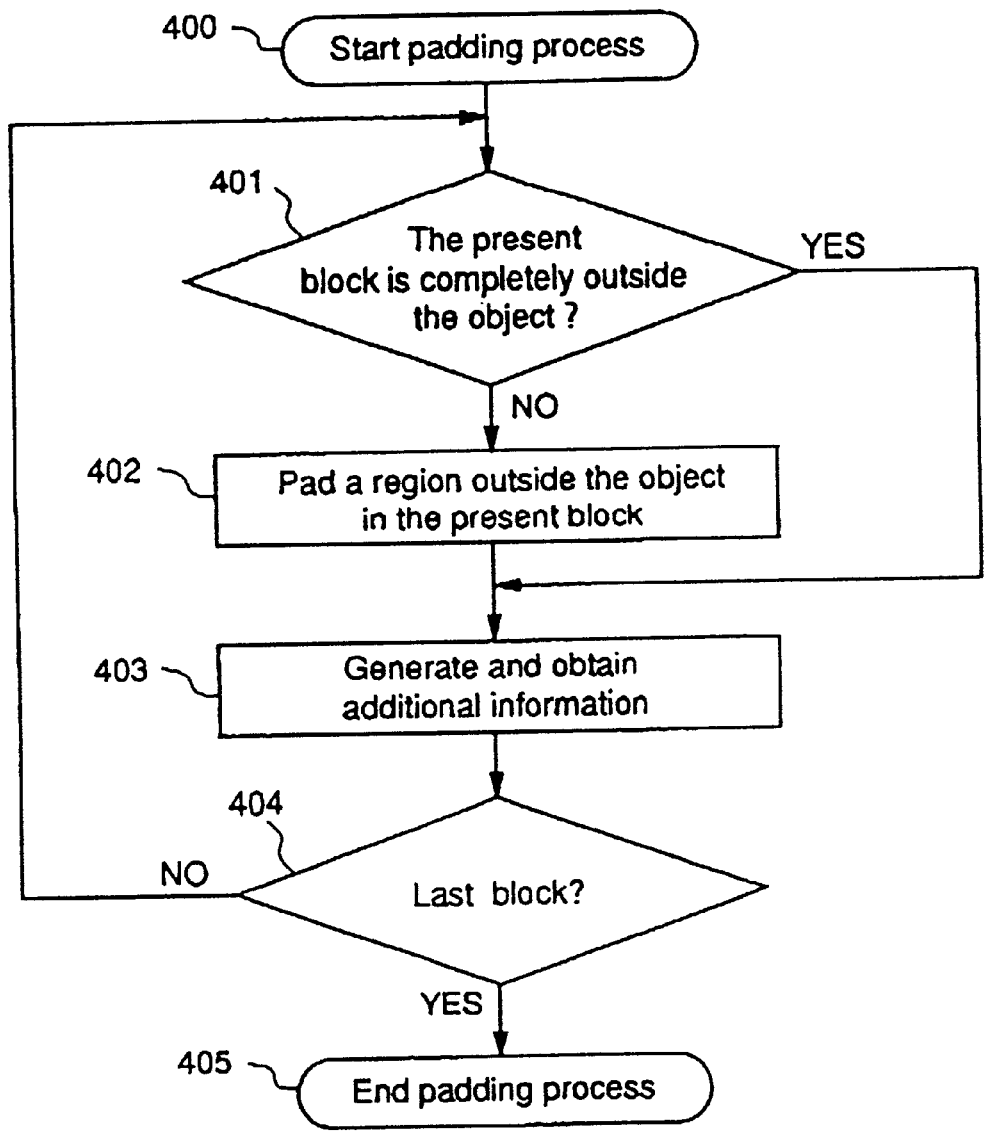
FIG. 19 is a flowchart for explaining the operation of a padding unit included in the decoding apparatus according to the third embodiment.

FIG. 19 is a flowchart for explaining the operation of the padding unit 308 included in the image signal decoding apparatus shown in FIG. 17.

In step 401, it is decided whether a block being processed in a prescribed order (target block) is completely outside the object or not. When it is completely outside the object, additional information showing that the target block is outside the object is generated in step 403. When the target block includes even a portion of the object, a region outside the object in the block is padded by a prescribed method (step 402), and additional information showing that the target block is inside the object or already padded is generated (step 403). The above-mentioned procedure is repeated until the last block is processed.

Although additional information is generated in step 403 in this third embodiment, significant signal, image signal, or side information generated in the coding process may be used, as it is, as additional information.

[Embodiment 4]

Figure 20:
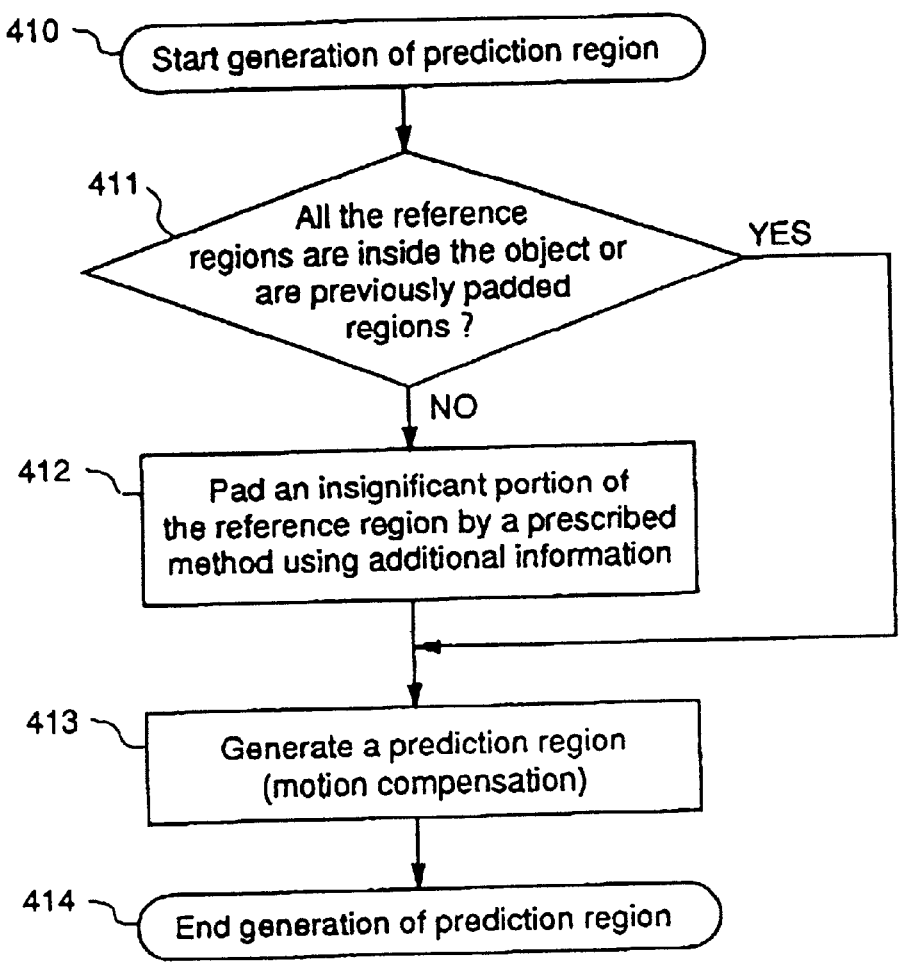
FIG. 20 is a flowchart for explaining the operation of a padding unit included in an image signal decoding apparatus according to a fourth embodiment of the invention.
Figure 21:
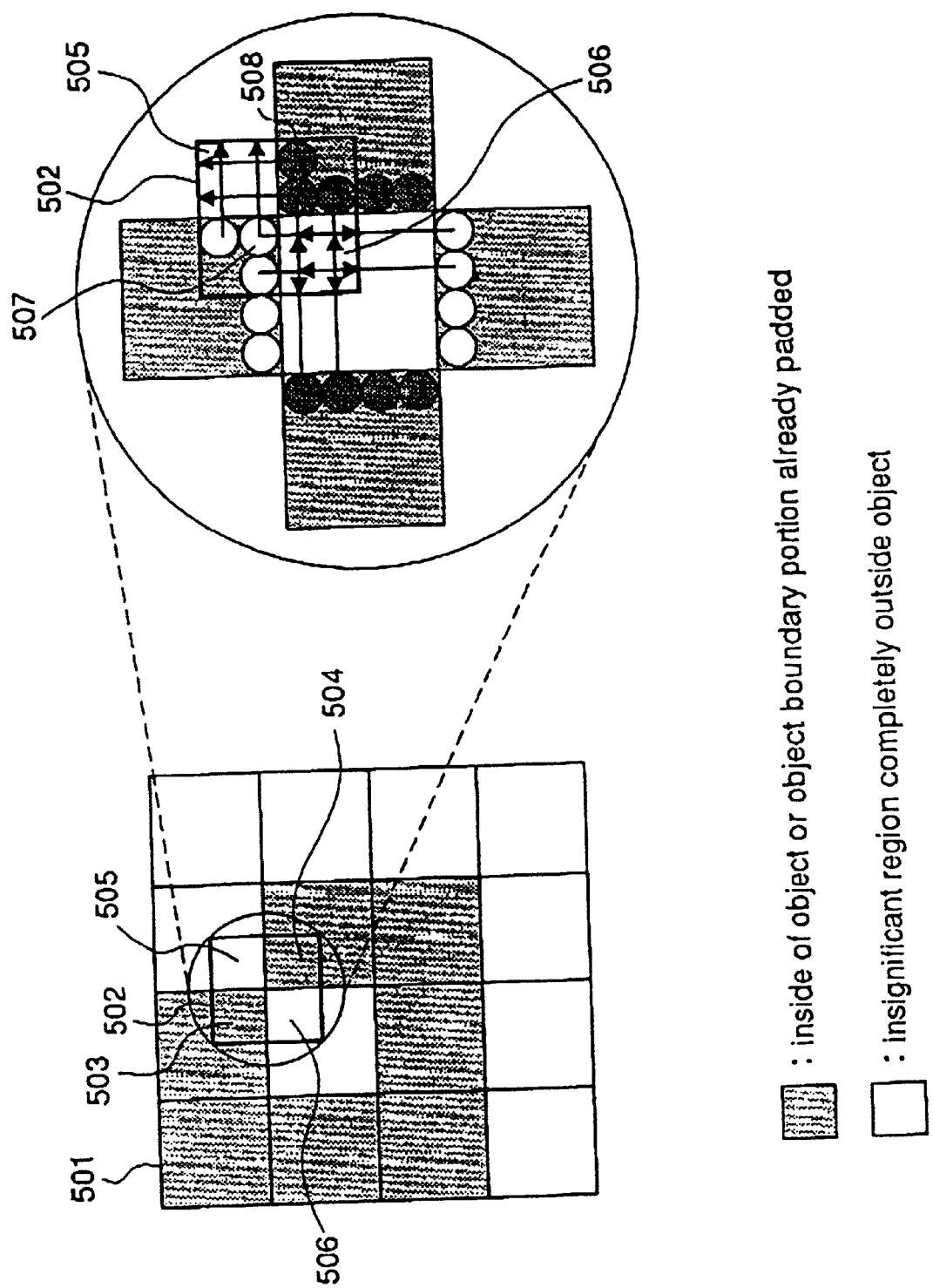
FIG. 21 is a schematic diagram for explaining the operation of a motion compensator included in the decoding apparatus according to the fourth embodiment.

FIG. 20 is a flowchart for explaining the operation of a motion compensator in an image signal decoding apparatus according to a fourth embodiment of the invention. More specifically, this flowchart shows the operation of the motion compensator 310 shown in FIG. 17, which performs motion compensation for an output padded by the padding unit 308 and stored in the frame memory 309. FIG. 21 shows an example of operation of the motion compensator 310.

In step 411, it is decided whether or not a block 309a being referred to (hereinafter, referred to as a reference block) output from the frame memory 309 is completely inside the object or is a region that has already been padded by the padding unit 308. When the reference block is completely inside the object or is a region already padded, ordinary motion compensation is executed in step 413. When the reference block includes an insignificant region that is completely outside the object, this insignificant region is padded by a prescribed method, such as the extending method, using previously provided additional information (step 412), and motion compensation is executed using the padded block (step 413).

FIG. 21 shows a case where the reference block includes insignificant regions. With respect to a reference image 501 used for motion compensation, when a reference block 502 includes portions completely inside the object or object boundary portions already padded 503 and 504 and insignificant portions 505 and 506 completely outside the object as shown in FIG. 21, or when the reference block is completely an insignificant region (not shown), the insignificant portions (insignificant region) are padded by a prescribed method, such as the extending method, using additional information. In FIG. 21, referring to pixel values 508 and 507 included in significant blocks adjacent to the insignificant portions 505 and 506, an average of these pixel values is obtained as a padding value, and the insignificant portions are padded with the padding value.

Although an average of plural pixel values is used as a padding value in FIG. 21, a pixel value of a block adjacent to the target block in a specific direction may be used as a padding value with reference to additional information.

In the above-mentioned padding process, only the insignificant portions (region) referred to by the motion compensator 310 are padded, padding of a necessary region only is realized.

In the above-mentioned image signal coding apparatus and image signal decoding apparatus, the padding unit or the motion compensator may be provided with a memory for temporarily storing additional information and a padding value required for padding.

FIGS. 22(a),(b) and 23(a),(b) are diagrams for explaining an image signal coding apparatus and an image signal decoding apparatus according to a modification of the fourth embodiment of the invention.

An image signal coding apparatus performs motion prediction for an input image signal, and performs motion compensation according to the prediction. In this modification of the fourth embodiment, a reference image for the motion prediction, i.e., a prediction image, is padded and, therefore, the motion prediction is performed using a portion of the padded reference image. There is a case where both of motion prediction and motion compensation are performed referring to the whole image. In this way, on the encoder side, motion compensation is performed on the basis of motion prediction, and a difference between an actual image and a motion-compensated image is encoded and sent to a decoder. On the decoder side, a motion vector detected in the encoder is obtained, and motion compensation is performed using a sub-prediction-region brought from the reference image. It is rare to bring, as a reference image, an image block as shown by a sub-prediction-region A which is referred to in motion compensation shown in FIG. 23(b). In many cases, a reference image is brought from a sub-image-block 1004 inside an image block 1000.

In this method, on the decoder side, only a minimum region, i.e., a region corresponding to a sub-image-block 500 shown in FIG. 22(a), is subjected to padding and, only when the sub-prediction-region A referred to in motion compensation protrudes over the sub-image-block 500 and padding for its peripheral pixels is needed, padding of image signal is performed in motion compensation.

Figure 23:
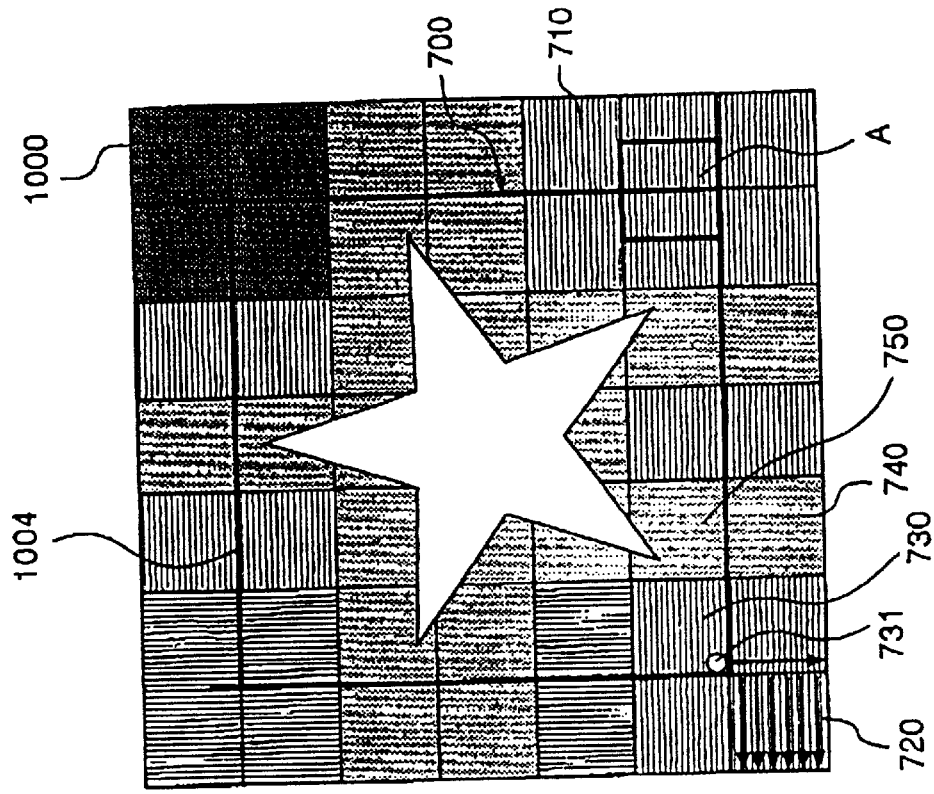
FIGS. 23(a) and 23(b) are schematic diagrams for explaining the operation of padding pixels during motion compensation, by the decoding apparatus according to the fourth embodiment.
Figure 23:
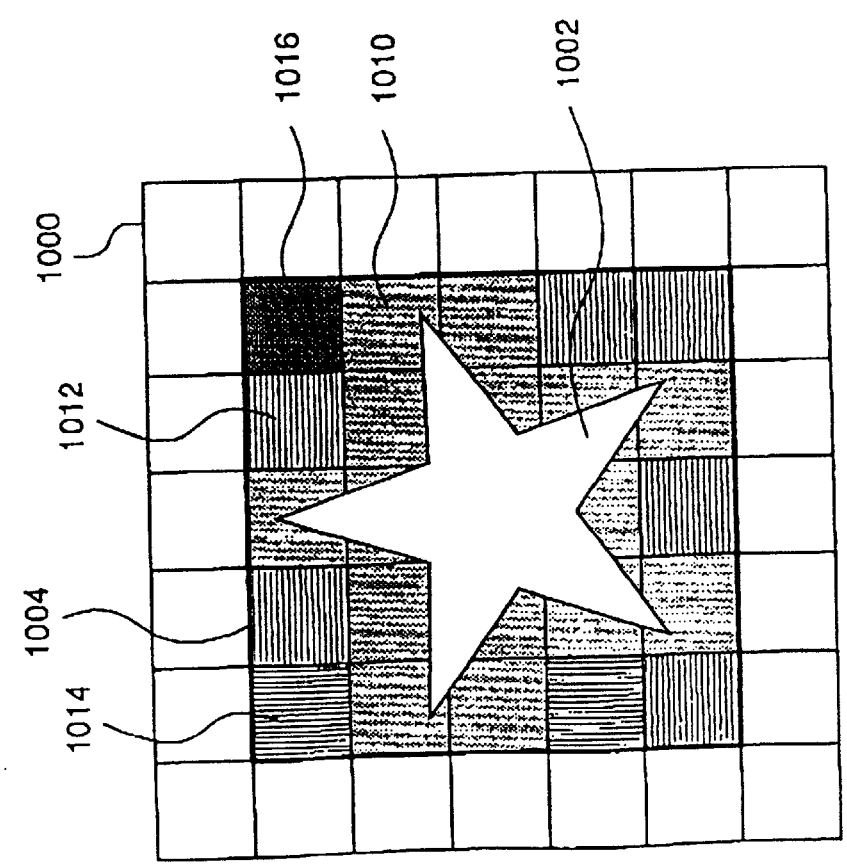

More specifically, since the encoder refers to the image in both motion detection and motion compensation, the whole image block 1000 is padded as shown in FIG. 23(*b*). On the other hand, since the decoder performs only motion compensation, to facilitate the padding process, an image region to be padded is specified in the whole image block, providing a rectangle region surrounding the target object and a margin region outside the rectangle region. Padding of insignificant region in the margin region is performed in motion compensation only when it is necessary.

Figure 22:
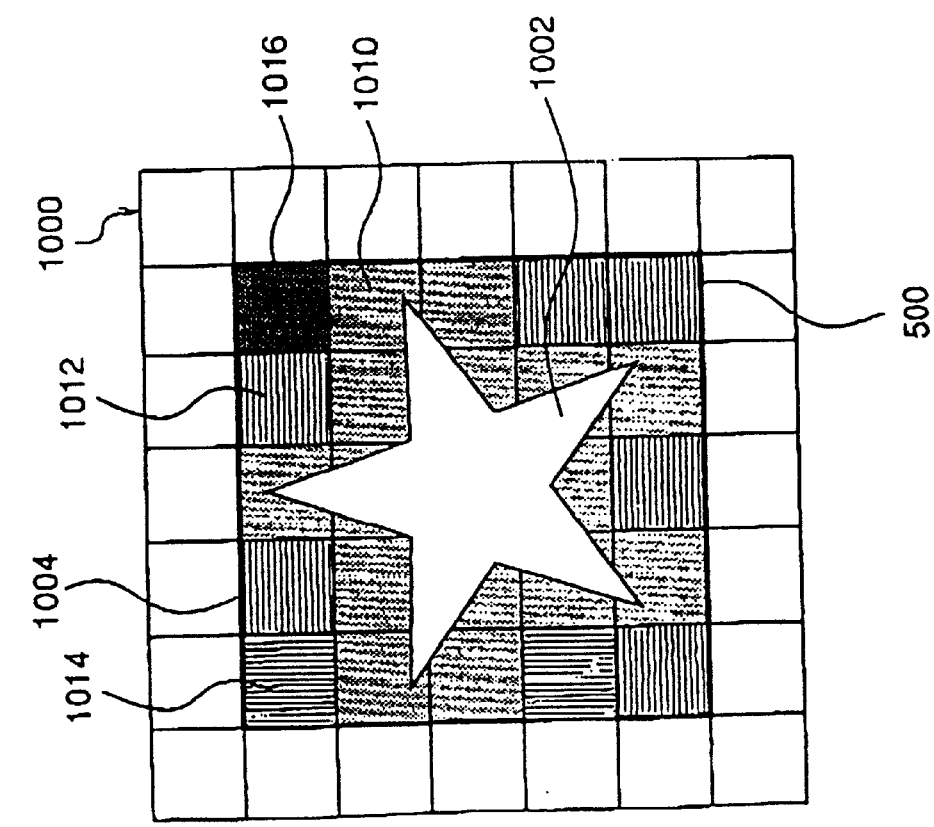
FIGS. 22(a) and 22(b) are schematic diagrams for explaining a padding process by the decoding apparatus according to the fourth embodiment.
Figure 22:
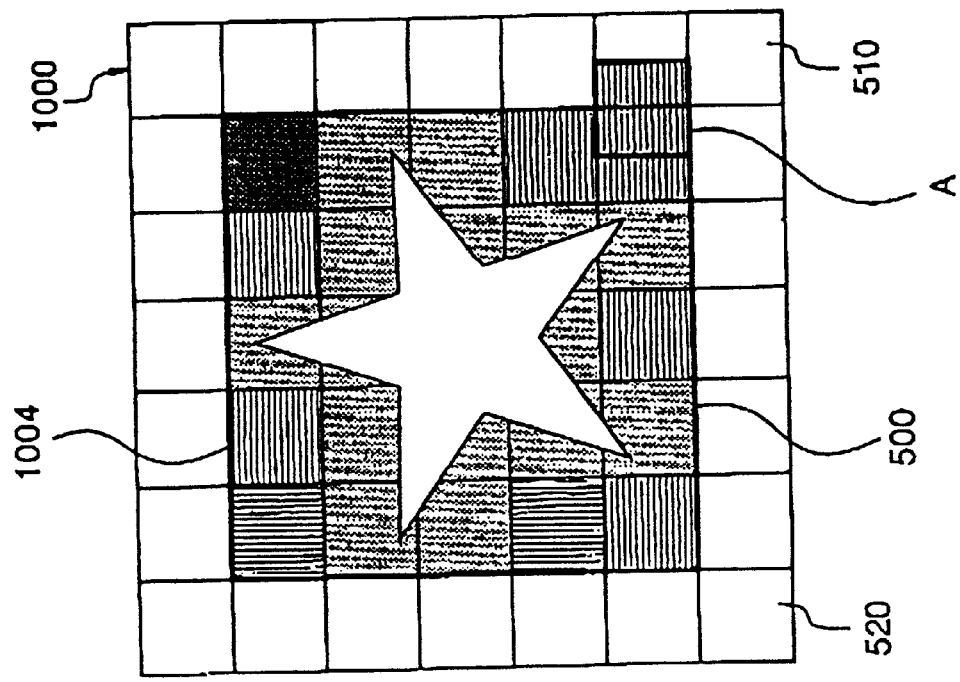

To be specific, on the decoder side, as shown in FIG. 22(*a*), padding of image signal is performed for the sub-image-block 500 in the image block 1000 using the above-mentioned method. In motion compensation, when the sub-reference-region A predicted in motion compensation does not protrude from the sub-image-block 500 in the image block 1000, motion compensation is performed with reference to pixel values of pixels which have already been padded However, when the sub-reference-region A predicted in motion compensation protrudes from the sub-image-block 700 in the image block 1000 as shown in FIG. 23(*b*), pixels in insignificant regions in outermost blocks 710 that protrude from the sub-image-block 700 are padded, and motion compensation is performed using the padded pixel values. Therefore, the padding process on the decoder side is lightened, whereby the memory capacity and the operation time are reduced.

The process of padding the frame-shaped region 710 outside the sub-image-block 700 will be described in detail. As shown in FIG. 23(*b*), for a lowermost-leftmost block 720 in the block 1000, a lowermost-leftmost pixel 731 in an upper-right block 730 is extended downward and then horizontally toward the left, whereby the block 720 is padded with the pixel value of the pixel 731. Further, for blocks other than the four-corner blocks in the frame-shaped region 710, for example, for a block 740, a pixel 750 inside the sub-image-block 700 is extended to the outside, whereby the block 740 is padded.

[Embodiment 5]

Figure 25:
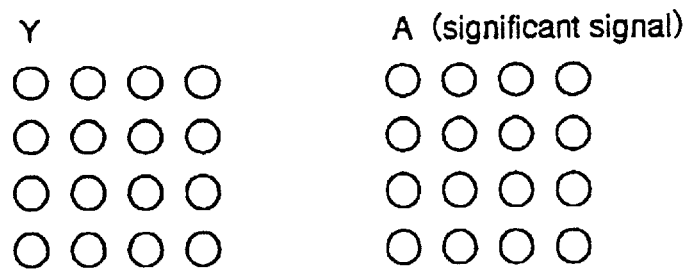
FIGS. 25(a) and 25(b) are schematic diagrams for explaining an image signal padding method according to a fifth embodiment of the invention.
Figure 25:
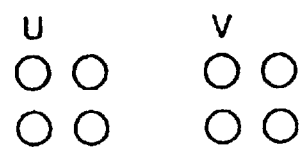

FIGS. 25(*a*) and 25(*b*) are schematic diagrams for explaining an image signal padding method according to a fifth embodiment of the invention. In this fifth embodiment, padding of pixel values is performed appropriately even when a significant signal does not correspond to an image signal (color signal)

In image processing, a color signal is composed of Y (luminance signal) and U,V (color-difference signals). Usually, a significant signal is of the same size as the luminance signal. However, there is a case where the color-difference signal is the half or quarter of the significant signal in size. For example, in a block having a size of 4×4 pixels, Y (luminance signal) and A (significant signal) are as shown in FIG. 25(*a*), but U and V (color-difference signals) have only the quarter as many pixels as Y and A, as shown in FIG. 25(*b*). In this case, it is necessary to match the size of A with the size of U and V by reducing A. However, this reduction has a risk of losing significant pixels corresponding to pixels of U and V, resulting in a case where a boundary region has no pixels to refer to. In this fifth embodiment, in such a case, padding is performed by a prescribed method such as the above-mentioned extending method, or by using a prescribed function such as the above-mentioned copying function and mirroring function. That is, the boundary region is padded with a prescribed value (fixed value) or an average of pixel values inside an object in a screen.

[Embodiment 6]

Figure 24:
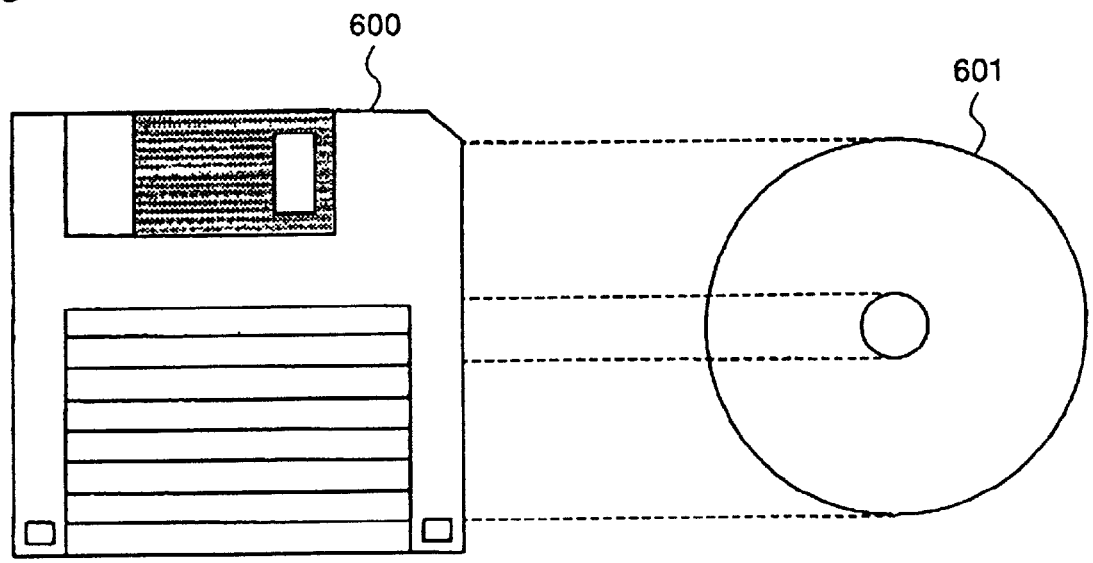
FIG. 24 is a schematic diagram illustrating a medium in which a program of an image signal padding method is recorded, according to a sixth embodiment of the invention.

The image signal padding methods, the image signal coding methods, and the image signal decoding methods according to the present invention can be implemented by programs, and the programs can be recorded on recording media such as floppy disks for transmission, whereby these methods are easily executed by individual computer systems. FIG. 24 shows a floppy disk according to a sixth embodiment of the invention. A floppy disk 600 contains a round shape disk 601, and programs of the image signal padding method, coding method, decoding method, and motion compensation method in the decoding method, according to the invention, can be recorded on the disk 601.

Although a floppy disk is described in this sixth embodiment, an optical disk may be employed in like manner. Further, any recording media may be employed as long as they can record programs, for example, IC cards and ROM cassettes.

As described above, in the image signal padding method of the present invention, not only the boundary region but also the insignificant region adjacent to the boundary region are padded, and motion detection and motion compensation are performed using the padded image. In addition, region by region padding is performed using additional information showing whether each region includes significant pixels or not. Therefore, in the coding and decoding processes, a prediction signal with less difference can be obtained even for an image of great motion, whereby delay time and arithmetic amount in the coding and decoding processes are significantly reduced.

What is claimed is:

1. A method of padding an image signal comprising the steps of dividing an image signal of an object having an arbitrary shape into plural regions;

processing the plural regions in a prescribed processing order;

padding a boundary region including a boundary of the object with a padding value obtained by a prescribed method;

padding an insignificant region, which abuts on a boundary region including a boundary of the object and is composed of insignificant pixels only, with a padding value obtained by a prescribed method; and, outputting the image signal, said method additionally comprising:

generating additional information showing whether significant pixels are included, for each of the plural regions, by a prescribed method, with reference to significant signals showing whether pixel values of pixels included in the plural regions are significant; and, performing padding of pixel values of pixels in the plural regions with reference to the additional information.

2. The method of claim 1 wherein said method of producing a padding value is to extend a pixel value inside the object in a block corresponding to the boundary region to an insignificant region outside the object.

3. The method according to claim 1 wherein a region which is composed of pixel values of insignificant pixels only and abuts on the boundary region in a horizontal direction is padded.

4. The method according to claim 1 wherein a region which is composed of pixel values of insignificant pixels only and abuts on the boundary region in a vertical direction is padded.

5. A method of padding an image signal as in claim 1, wherein said method is performed simultaneously with motion compensation.

6. A method of padding an image signal comprising the steps of dividing an image signal of an object having an arbitrary shape into plural regions;

processing the plural regions in a prescribed processing order;

padding an insignificant region, which abuts on a boundary region including a boundary of the object and is composed of insignificant pixels only, with a padding value obtained using pixel values of significant pixels in the boundary region and a prescribed function; and, outputting the image signal, said method additionally comprising:

generating additional information showing whether significant pixels are included, for each of the plural regions, by a prescribed method, with reference to significant signals showing whether pixel values of pixels included in the plural regions are significant; and performing padding of pixel values of pixels in the plural regions with reference to the additional information.

7. The method of claim 6 wherein said padding of pixel values is performed using a copying function which uses pixel values of pixels included in the boundary region and corresponding to positions of pixels included in the insignificant region to be padded.

8. The method of claim 6 wherein said padding of pixel values is performed using a mirroring function which uses pixel values of pixels that are included in the boundary region and are positioned symmetrically with positions of pixels included in the insignificant region to be padded across a boundary where the boundary region abuts on the insignificant region.

9. A method of padding an image signal comprising the steps of dividing an image signal of an object having an arbitrary shape into plural regions;

processing the plural regions in a prescribed processing order;

padding pixel values of insignificant pixels in a boundary region including a boundary of the object with a padding value obtained by a prescribed method;

padding an insignificant region, which abuts on the boundary region and is composed of insignificant pixels only, with a padding value obtained using the padded pixel values of pixels in the boundary region and a second function; and, outputting the image signal, said method additionally comprising:

generating additional information showing whether significant pixels are included, for each of the plural regions, by a prescribed method, with reference to significant signals showing whether pixel values of pixels included in the plural regions are significant; and performing padding of pixel values of pixels in the plural regions with reference to the additional information.

10. The method of claim 9 wherein the padding of pixel values of insignificant pixels in the boundary region including the object boundary is performed using a copying function which uses the padded pixel values of pixels included in the boundary region and corresponding to positions of pixels included in the insignificant region to be padded.

11. The method of claim 9 wherein the padding of pixel values in the insignificant region adjacent to the boundary region is performed using a mirroring function which uses the padded pixel values of pixels that are included in the boundary region and are positioned symmetrically with positions of pixels included in the insignificant region to be padded across a boundary where the padded boundary region abuts on the insignificant region.

12. A method of padding an image signal comprising the steps of dividing an image signal of an object having an arbitrary shape into plural regions;

processing the plural regions in a prescribed processing order;

padding an insignificant region, which abuts on a boundary region including a boundary of the object and is composed of insignificant pixels only, with a padding value obtained by a prescribed method; and, outputting the image signal, said method additionally comprising:

generating additional information showing whether significant pixels are included, for each of the plural regions, by a prescribed method, with reference to significant signals showing whether pixel values of pixels included in the plural regions are significant;

in a case where a target region is not an insignificant region, when it is decided with reference to the additional information that a past region adjacent to the target region in the processing order is an insignificant region, padding the past region with a padding value obtained by a prescribed method; and in a case where the target region is an insignificant region, when it is decided with reference to the additional information that a past region adjacent to the target region in the processing order is not an insignificant region, padding the target region with a padding value obtained by a prescribed method.

13. The method of claim 12 wherein:

in the case where the target region is not an insignificant region, when it is decided with reference to the additional information that the past region adjacent to the target region in the processing order is an insignificant region, the past region is padded using a copying function which uses pixel values of pixels included in the target region and corresponding to positions of pixels included in the past region; and in the case where the target region is an insignificant region, when it is decided with reference to the additional information that the past region adjacent to tho target region in the processing order is not an insignificant region, the target region is padded using a copying function that uses pixel values of pixels included in the past region and corresponding to positions of pixels included in the target region.

14. The method of claim 12 wherein:

in the case where the target region is not an insignificant region, when it is decided with reference to the additional information that the past region adjacent to the target region in the processing order is an insignificant region, the past region is padded using a mirroring function which uses pixel values of pixels that are included in the target region and are positioned symmetrically with positions of pixels included in the past region across a boundary where the past region abuts on the target region; and in the case where the target region is an insignificant region, when it is decided with reference to the additional information that the past region adjacent to the target region in the processing order is not an insignificant region, the target region is padded using a mirroring function which uses pixel values of pixels that are included in the past region and are positioned symmetrically with positions of pixels included in the target region across a boundary where the insignificant region abuts on the past region.

15. A method of padding an image signal comprising the steps of dividing an image signal of an object having an arbitrary shape into plural regions;

processing the plural regions in a prescribed processing order;

padding an insignificant region, which abuts on a boundary region including a boundary of the object and is composed of insignificant pixels only, with a padding value obtained by a prescribed method; and outputting the image signal, said method additionally comprising:

generating additional information showing whether significant pixels are included, for each of the plural regions, by a prescribed method, with reference to significant signals showing whether pixel values of pixels included in the plural regions are significant;

in a case where a target region is not an insignificant region, when it is decided with reference to the additional information that a past region adjacent to the target region in the processing order is an insignificant region, padding the past region with a padding value obtained by pixel values of significant pixels included in the target region and a prescribed function; and in a case where the target region is an insignificant region, when it is decided with reference to the additional information that a past region adjacent to the target region in the processing order is not an insignificant region, padding the target region with pixel values of significant pixels included in the past region and a prescribed function.

16. A method of padding an image signal comprising the steps of dividing an image signal of an object having an arbitrary shape into plural regions;

processing the plural regions in a prescribed processing order;

padding an insignificant region, which abuts on a boundary region including a boundary of the object and is composed of insignificant pixels only, with a padding value obtained by a prescribed method; and outputting the image signal, said method additionally comprising:

generating additional information showing whether significant pixels are included, for each of the plural regions, by a prescribed method, with reference to significant signals showing whether pixel values of pixels included in the plural regions are significant;

in a case where a target region is not an insignificant region, padding pixel values of insignificant pixels included in the target region using a pixel value obtained by a prescribed method;

when it is decided with reference to the additional information that a past region adjacent to the target region in the processing order is an insignificant region, padding the past region with a pixel value obtained using the padding pixel values of pixels included in the target region and a second function; and in a case where the target region is an insignificant region, when it is decided with reference to the additional information that a past region adjacent to the target region in the processing order is not an insignificant region, padding the target region with a padding value obtained using pixel values of pixels included in the past region and the second function.

17. The method of claim 16 wherein:

in the case where the target region is not an insignificant region, pixel values of insignificant pixels included in the target region are padded with a pixel value obtained by a prescribed method;

when it is decided with reference to the additional information that the past region adjacent to the target region in the processing order is an insignificant region, the past region is padded using a copying function that uses the padded pixel values of pixels included in the target region and corresponding to positions of pixels included in the past region; and in the case where the target region is an insignificant region, when it is decided with reference to the additional information that the past region adjacent to the target region in the processing order is not an insignificant region, the target region is padded using a copying function that uses pixel values of pixels included in the past region and corresponding to positions of pixels included in the target region.

18. The method of claim 16 wherein:

in the case where the target region is not an insignificant region, pixel values of insignificant pixels included in the target region are padded with a pixel value obtained by a prescribed method;

when it is decided with reference to the additional information that the past region adjacent to the target region in the processing order is an insignificant region, the past region is padded using a mirroring function which uses the padded pixel values of pixels that are included in the target region and are positioned symmetrically with positions of pixels included in the past region across a boundary where the past region abuts on the target region; and in the case where the target region is an insignificant region, when it is decided with reference to the additional information that the past region adjacent to the target region in the processing order is not an insignificant region, the target region is padded using a mirroring function that uses pixel values of pixels that are included in the past region and are positioned symmetrically with positions of pixels included in the target region across a boundary where the past region abuts on the target region.

19. A method of padding an image signal comprising the steps of dividing an image signal of an object having an arbitrary shape into plural regions;

processing the plural regions in a prescribed processing order;

padding an insignificant region, which abuts on a boundary region including a boundary of the object and is composed of insignificant pixels only, with a padding value obtained by using pixel values of significant pixels within the boundary region and a prescribed function; and, outputting the image signal, wherein said padding value is obtained using a copying function that uses pixel values of pixels included in the boundary region and corresponding to positions of pixels included in the insignificant region to be padded.

20. A method of padding an image signal comprising the steps of dividing an image signal of an object having an arbitrary shape into plural regions;

processing the plural regions in a prescribed processing order;

padding an insignificant region, which abuts on a boundary region including a boundary of the object and is composed of insignificant pixels only, with a padding value obtained by using pixel values of significant pixels within the boundary region and a prescribed function; and, outputting the image signal, wherein said padding value is obtained using a mirroring function that uses pixel values of pixels that are included in the boundary region and are positioned symmetrically with positions of pixels included in the insignificant region to be padded across a boundary where the boundary region abuts on the insignificant region.

21. A method of padding an image signal comprising the steps of dividing an image signal of an object having an arbitrary shape into plural regions;

processing the plural regions in a prescribed processing order;

padding pixel values of insignificant pixels in a boundary region including a boundary of the object with a padding value obtained by a prescribed method;

padding an insignificant region adjacent to the boundary region and comprising only insignificant pixels with a padding value obtained by using the padded pixel values of pixels in the boundary region and a second function; and, outputting the image signal, wherein said padding value is obtained using a copying function that uses the padded pixel values of pixels included in the boundary region and corresponding to positions of pixels included in the insignificant region to be padded.

22. A method of padding an image signal comprising the steps of dividing an image signal of an object having an arbitrary shape into plural regions;

processing the plural regions in prescribed processing order;

padding pixel values of insignificant pixels in a boundary region including a boundary of the object with a padding value obtained by a prescribed method; padding an insignificant region adjacent to the boundary region and comprising only insignificant pixels with a padding value obtained by using the padded pixel values of pixels in the boundary region and a second function; and, outputting the image signal, wherein said padding value is obtained using a mirroring function that uses the padded pixel values of pixels that are included in the boundary region and are positioned symmetrically with positions of pixels included in the insignificant region to be padded across a boundary where the padded boundary region abuts on the insignificant region.

23. An image signal coding apparatus for padding an image signal, said apparatus comprising:

an input means for inputting an image signal of an object having an arbitrary shape;

means for dividing the image signal into plural regions adjacent to each other;

means for processing the plural regions in a prescribed processing order;

prediction region generation means for outputting a target region and a prediction region to a first addition means for generating a difference region;

coding means for receiving said difference region and converting the difference region into a compressed difference region by a third method;

decoding means for receiving said compressed difference region and restoring said compressed difference region to a decompressed difference region by a fourth method;

second addition means for receiving said decompressed difference region and generating a reproduced region by adding the prediction region to the decompressed difference region;

padding means for receiving the reproduced region and padding pixel values of insignificant pixels included in the reproduced region by a fifth method;

memory for storing said padded region and supplying said padded region to the prediction region generation means for generating the prediction region;

wherein said apparatus pads an insignificant region which abuts a boundary region including a boundary of the object and is composed of insignificant pixels only with a padding value obtained by a prescribed method, generates additional information showing whether significant pixels are included for each of the plural regions by a prescribed method with reference to significant signals showing whether pixel values of pixels included in the plural regions are significant, pads pixel values of pixels in the plural regions based upon the additional information, and outputs a compressed difference region signal.

24. The apparatus of claim 23 wherein the prediction region generation means generates a prediction region with reference to only the padded region.

25. The apparatus of claim 23 wherein the prediction region generation means generates a prediction pads an insignificant region that abuts on a boundary region including a boundary of the object and is composed of insignificant pixels only, by a prescribed method.

26. The apparatus of claim 23 wherein the prediction region generation means pads only pixel values of insignificant pixels included in at least one reference region which is referred to when generating the prediction region, by a prescribed method.

27. The apparatus of claim 23 further including a local memory for temporarily holding additional information which is referred to for the padding.

28. An image signal coding apparatus comprising:

an input means for inputting an image signal of an object having an arbitrary shape;

means for dividing the image signal into plural regions adjacent to each other;

means for processing the plural regions in a prescribed processing order;

prediction region generation means for outputting a target region and a prediction region to a first addition means for generating a difference region;

coding means for receiving said difference region and converting the difference region into a compressed difference region by a third method;

decoding means for receiving said compressed difference region and restoring said compressed difference region to a decompressed difference region to a decompressed difference region by a fourth method;

second addition means for receiving said decompressed difference region and generating a reproduced region by adding the prediction region to the decompressed difference region;

first padding means for receiving the reproduced region and padding pixel values of insignificant pixels in a boundary region including a boundary of the object included in the reproduced region by a sixth method;

a first memory for inputting and storing a padded region;

a second padding means for inputting the contents of said first memory wherein an insignificant region which abuts on the boundary region is included in the first memory content and is composed of insignificant pixels only;

a second memory for storing the padded region as a second padded region wherein said second padded region is supplied to the prediction region generation means;

wherein said apparatus pads pixel values of insignificant pixels in a boundary region including a boundary of the object with a padding value obtained by a prescribed method, pads an insignificant region which abuts on the boundary region and is composed of insignificant pixels only with a padding value obtained using the padded pixel values of pixels in the boundary region and a second function, generates additional information showing whether significant pixels are included for each of the plural regions by a prescribed method with reference to significant pixels showing whether pixel values of pixels included in the plural regions are significant, pads pixel values of pixels in the plural regions based upon the additional information, and outputs the image signal and a compressed difference region signal.

29. The apparatus of claim 28 wherein the prediction region generation means generates a prediction region with reference to only the padded region.

30. The apparatus of claim 28 wherein the prediction region generation means generates a prediction pads an insignificant region that abuts on a boundary region including a boundary of the object and is composed of insignificant pixels only, by a prescribed method.

31. The apparatus of claim 28 wherein the prediction region generation means pads only pixel values of insignificant pixels included in at lest one reference region which is referred to for generating the prediction region, by a prescribed method.

32. The apparatus of claim 28 further including a local memory for temporarily holding additional information which is referred to for the padding.

33. An image signal decoding apparatus for padding an image signal comprising:

an input means for receiving a coded signal which has been compressively coded;

a data analysis means for analyzing the coded signal to produce a compressed difference signal;

a decoding means for decoding said compressed difference signal and generating a decompressed difference signal;

prediction signal generating means for generating a prediction signal using an image signal obtained from a memory;

addition means for adding the decompressed difference signal to the prediction signal to produce a reproduced signal;

padding means for padding pixel values of insignificant pixels included in the reproduced signal by a prescribed method wherein the padded signal is stored in said memory;

wherein said apparatus pads an insignificant region which abuts on a boundary region including a boundary of the object and is composed of insignificant pixels only with a padding value obtained by a prescribed method, generates additional information showing whether significant pixels are included for each of the plural regions by a prescribed method with reference to significant signals showing whether pixel values of pixels included in the plural regions are significant, pads pixel values of pixels in the plural regions based upon the additional information and outputs a padded image signal.

34. The apparatus of claim 33 wherein the prediction region generation means generates a prediction region with reference to only the padded region.

35. The apparatus of claim 33 wherein the prediction region generation means generates a prediction pads an insignificant region that abuts on a boundary region including a boundary of the object and is composed of insignificant pixels only, by a prescribed method.

36. The apparatus of claim 33 wherein the prediction region generation means pads only pixel values of insignificant pixels included in at least one reference region which is referred to when generating the prediction region, by a prescribed method.

37. The apparatus of claim 33 further including a local memory for temporarily holding additional information which is referred to for the padding.

38. An image signal decoding apparatus for padding an image signal comprising:

an input means for receiving a coded signal which has been compressively coded;

data analysis means for analyzing the coded signal to produce a compressed difference signal;

decoding means for decoding the compressed difference signal and generating a decompressed difference signal;

prediction signal generating means for generating a prediction signal using an image signal obtained from a second memory;

addition means for adding the decompressed difference signal to the prediction signal to produce a reproduced signal;

first padding means for padding pixel values of insignificant pixels in the boundary region when a reproduced signal is a boundary region including the object boundary;

first memory for storing a padded region and, second padding means for padding an insignificant region which abuts on the boundary region and is stored in the first memory and is composed of insignificant pixels by a prescribed method, said padded region being stored in the second memory, wherein said apparatus pads pixel values of insignificant pixels in a boundary region including a boundary of the object with a padding value obtained by a prescribed method, pads an insignificant region which abuts on the boundary region and is composed of insignificant pixels only with a padding value obtained using the padded pixel values of pixels in the boundary region and a second function, generates additional information showing whether significant pixels are included for each of the plural regions by a prescribed method with reference to significant signals showing whether pixel values of pixels included in plural regions are significant, performs padding of pixel values of pixels in the plural region with reference to the additional information and outputs a padded image signal.

39. The apparatus of claim 38 wherein the prediction region generation means generates a prediction region with reference to only the padded region.

40. The apparatus of claim 38 wherein the prediction region generation means generates a prediction pads an insignificant region that abuts on a boundary region including a boundary of the object and is composed of insignificant pixels only, by a prescribed method.

41. The apparatus of claim 38 wherein the prediction region generation means pads only pixel values of insignificant pixels included in at least one reference region which is referred to for generating the prediction region, by a prescribed method.

42. The apparatus of claim 38 further including a local memory for temporarily holding additional information which is referred to for the padding.

43. A recording medium having a program of an image signal padding method recorded thereon wherein said method comprises dividing an image signal of an object having an arbitrary shape into plural regions;

processing the plural regions in a prescribed processing order;

padding an insignificant region, which abuts on a boundary region including a boundary of the object and is composed of insignificant pixels only, with a padding value obtained by a prescribed method;

generating additional information showing whether significant pixels are included for each of the plural regions, by a prescribed method, with reference to significant signals showing whether pixel values of pixels included in the plural regions are significant;

performing padding of pixel values of pixels in the plural regions with reference to the additional information; and, outputting the image signal.

44. An image signal decoding apparatus for padding an image signal comprising:

input means for receiving a coded signal which has been compressively coded;

data analysis means for analyzing the coded signal to produce a compressed difference signal;

decoding means for decoding the compressed difference signal and generating a decompressed difference signal;

prediction signal generating means for generating a prediction signal using an image signal obtained from a memory;

addition means for adding the decompressed difference signal to the prediction signal to produce a reproduced signal;

padding means for padding pixel values of insignificant pixels included in reproduced signals by a prescribed method, said padded pixels being stored in the memory and, wherein the padding means also performs padding of pixel values included in an inside region of a rectangular region including an object having an arbitrary shape among the whole image block excluding a peripheral region using a padding method and padding of an insignificant region in the peripheral region being performed simultaneously with motion compensation when a sub-prediction-region is referred to for motion by a prediction region generation means;

wherein said apparatus pads an insignificant region which abuts on a boundary region including a boundary of the object and is composed of insignificant pixels only with a padding value obtained by a prescribed method, generates additional information showing whether significant pixels are included for each of the plural regions by a prescribed method with reference to significant signals showing whether pixel values of pixels included in plural regions are significant, pads pixel values of pixels in the plural regions based upon the additional information and outputs the image signal.

45. An image signal decoding apparatus for padding an image signal comprising:

an input means for receiving a coded signal which has been compressively coded;

data analysis means for analyzing the coded signal to produce a compressed difference signal;

decoding means for decoding the compressed difference signal and generating a decompressed difference signal;

prediction signal generating means for generating a prediction signal using an image signal obtained from a second memory;

addition means for adding the decompressed difference signal to the prediction signal to produce a reproduced signal;

first padding means for padding pixel values of insignificant pixels by a prescribed method when the reproduced signal is a boundary region including the object boundary pixel;

first memory for storing the padded region and an insignificant region which abuts on the boundary region;

second padding means for padding an insignificant region which abuts on the boundary region stored in the first memory by a prescribed method;

second memory for storing to padded region and wherein the first and second padding means perform padding of pixel values included in an inside region of a rectangular region including an object having an arbitrary shape among the whole image block excluding a peripheral region and when a sub-prediction-region which is referred to for motion compensation includes a region outside the inside region, padding of an insignificant region in the peripheral region is performed simultaneously with a motion compensation by a prediction region generation means;

wherein said apparatus divides an image signal of an object having an arbitrary shape into plural regions, processing the plural regions in a prescribed processing order, generates additional information showing whether significant pixels are included for each of the plural regions by a prescribed method with reference to significant signals showing whether pixel values of pixels included in the plural regions are significant, pads pixel values of pixels in the plural regions based upon the additional information and outputs the image signal.

46. An image signal coding apparatus for padding an image signal, said apparatus comprising:

an input means for inputting an image signal of an object having an arbitrary shape;

means for dividing the image signal into plural regions adjacent to each other;

means for processing the plural regions in a prescribed processing order;

prediction region generation means for outputting a target region and a prediction region to a first addition means for generating a difference region;

coding means for receiving said difference region and converting the difference region into a compressed difference region by a third method;

decoding means for receiving said compressed difference region and restoring said compressed difference region to a decompressed difference region by a fourth method;

second addition means for receiving said decompressed difference region and generating a reproduced region by adding the prediction region to the decompressed difference region;

padding means for receiving the reproduced region and padding pixel values of insignificant pixels included in the reproduced region by a fifth method, said padded pixels being stored in the memory and, wherein the padding means also performs padding of pixel values included in an inside region of a rectangular region including an object having an arbitrary shape among the whole image block using a padding of an insignificant region in the peripheral region being performed simultaneously with motion compensation when a sub-prediction-region is referred to for motion compensation by a prediction region generation means;

memory for storing said padded region and supplying said padded region to the prediction region generation means for generating the prediction region;

wherein said apparatus pads an insignificant region which abuts on a boundary region including a boundary of the object and is composed of insignificant pixels only with a padding value obtained by a prescribed method, generates additional information showing whether significant pixels are included for each of the plural regions by a prescribed method with reference to significant signals showing whether pixel values of pixels included in the plural regions are significant, pads pixel value of pixels in the plural regions based upon the additional information, and outputs a compressed difference region signal.

47. An image signal coding apparatus comprising:

an input means for inputting an image signal of an object having an arbitrary shape;

means for dividing the image signal into plural regions adjacent to each other;

means for processing the plural regions in a prescribed processing order;

prediction region generation means for outputting a target region and a prediction region to a first addition means for generating a difference region;

coding means for receiving said difference region and converting the difference region into a compressed difference region by a third method;

decoding means for receiving said compressed difference region and restoring said compressed difference region to a decompressed difference region by a fourth method;

second addition means for receiving said decompressed difference region and generating a reproduced region by adding the prediction region to the decompressed difference region;

first padding means for receiving the reproduced region and padding pixel values of insignificant pixels in a boundary region including a boundary of the object included in the reproduced region by a sixth method;

a first memory for inputting and storing a padded region;

a second padding means for inputting the contents of said first memory wherein an insignificant region which abuts on the boundary region is included in the first memory content and is composed of insignificant pixels only;

a second memory for storing the padded region as a second padded region wherein said second padded region is supplied to the prediction region generation means; and wherein the first and second padding means perform padding of pixel values included in an inside region of a rectangular region including an object having an arbitrary shape among the whole image block and when a sub-prediction-region which is referred to for motion compensation includes a region outside the inside region, padding of an insignificant region in the peripheral region is performed simultaneously with a motion compensation by a predication region generation means;

wherein said apparatus pads pixel values of insignificant pixels in a boundary region including a boundary of the object with a padding value obtained by a prescribed method, pads an insignificant region which abuts on the boundary region and is composed of insignificant pixels only with a padding value obtained using the padded pixel values of pixels in the boundary region and a second function, generates additional information showing whether significant pixels are included for each of the plural regions by a prescribed method with reference to significant signals showing whether pixel values of pixels included in the plural regions are significant, pads pixel value of pixels in the plural regions based upon the additional information, and outputs the image signal and a compressed difference region signal.

* * * * *